United States Patent
Yukumatsu

(10) Patent No.: US 10,001,556 B2
(45) Date of Patent: Jun. 19, 2018

(54) FMCW RADAR APPARATUS

(71) Applicant: DENSO CORPORATION, Kariya, Aichi-pref. (JP)

(72) Inventor: Masanobu Yukumatsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 352 days.

(21) Appl. No.: 14/653,252

(22) PCT Filed: Dec. 13, 2013

(86) PCT No.: PCT/JP2013/083444
§ 371 (c)(1),
(2) Date: Jun. 17, 2015

(87) PCT Pub. No.: WO2014/097981
PCT Pub. Date: Jun. 26, 2014

(65) Prior Publication Data
US 2015/0355321 A1    Dec. 10, 2015

(30) Foreign Application Priority Data
Dec. 17, 2012 (JP) .................. 2012-274827

(51) Int. Cl.
*G01S 13/34* (2006.01)
*G01S 7/35* (2006.01)
*G01S 13/93* (2006.01)

(52) U.S. Cl.
CPC ............. *G01S 13/345* (2013.01); *G01S 7/35* (2013.01); *G01S 13/343* (2013.01); *G01S 13/931* (2013.01)

(58) Field of Classification Search
CPC .................................................. G01S 13/345
(Continued)

(56) References Cited

U.S. PATENT DOCUMENTS

2003/0052813 A1* 3/2003 Natsume ................ G01S 7/354
342/70
2005/0168377 A1    8/2005 Kai
(Continued)

FOREIGN PATENT DOCUMENTS

JP   H07-151852   6/1995
JP   H10-20025    1/1998
(Continued)

OTHER PUBLICATIONS

International Preliminary Report on Patentability and Written Opinion (English Translation); International application No. PCT/JP2013/083444; Filed on Dec. 13, 2013; dated Jul. 2, 2015; 7 pages.
(Continued)

*Primary Examiner* — Gregory C. Issing
*Assistant Examiner* — Helena H Seraydaryan
(74) *Attorney, Agent, or Firm* — Knobbe, Martens, Olson & Bear, LLP

(57) ABSTRACT

An FMCW (frequency modulated continuous wave) radar apparatus is provided. The apparatus transmits a transmission signal that includes a first frequency-rise time period whose frequency sequentially rises with a first modulated gradient, a first frequency-fall time period whose frequency sequentially falls with the first modulated gradient, a second frequency-rise time period whose frequency sequentially rises with a second modulated gradient different from the first modulated gradient, and a second frequency-fall time period whose frequency sequentially falls with the second modulated gradient. In the apparatus, frequencies of a plurality of peaks are specified in respect of each of beat signals obtained in response to the transmission. Using the specified plurality of peaks as objects, a notification is given as to the presence of oscillation in a power supply bias circuit, on the basis of that, of the groups each formed by extracting peaks
(Continued)

in a manner of extracting one from each of the beat signals, there is a group in which all the peaks in the group are within the same frequency range.

14 Claims, 9 Drawing Sheets

(58) Field of Classification Search
USPC .......................................................... 342/70
See application file for complete search history.

(56) References Cited

U.S. PATENT DOCUMENTS

2006/0170587 A1    8/2006  Kai
2008/0158046 A1    7/2008  Kai

FOREIGN PATENT DOCUMENTS

| JP | H11-133144   | 5/1999  |
| JP | 2004-85452   | 3/2004  |
| JP | 2005-221343  | 8/2005  |
| JP | 2008-107281  | 5/2008  |
| JP | 2009-222472  | 10/2009 |
| WO | WO2014097981 | 6/2014  |

OTHER PUBLICATIONS

International Search Report; International Application No. PCT/JP2013/083444, filing date: Dec. 13, 2013; 2 pages.

* cited by examiner

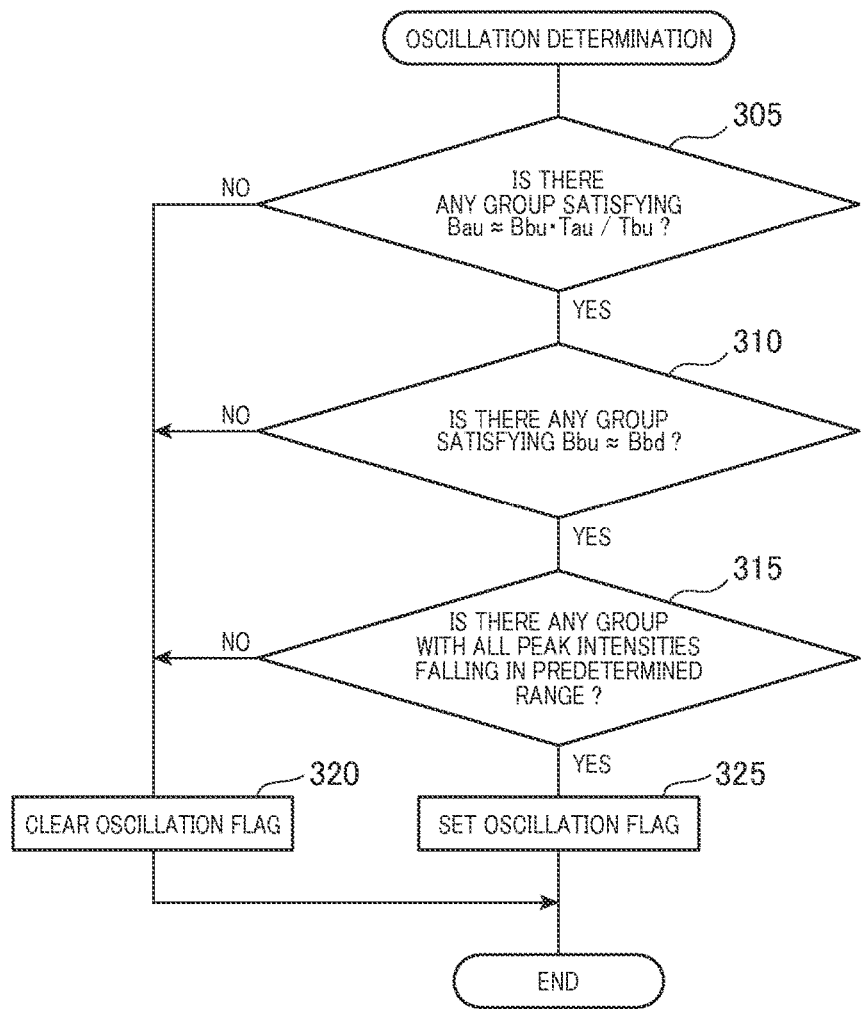

FMCW RADAR APPARATUS

CROSS-REFERENCE TO RELATED APPLICATION

This application is based on and claims the benefit of priority from earlier Japanese Patent Application No. 2012-274827 filed on Dec. 17, 2012 the descriptions of which are incorporated herein by reference.

BACKGROUND

Technical Field

The present invention relates to a type of radar apparatus called a frequency modulated continuous wave (FMCW) radar.

Background Art

There are various types of radar apparatuses depending on the modulation methods and the measurement principles of transmitted radio waves. A frequency modulated continuous wave (FMCW) radar (hereinafter simply referred to as FMCW radar apparatus) is one of such apparatuses.

PLT 1 describes a technique of removing noise which is constantly mixed with beat signals (noise components having small time variability in frequency and level) in such an FMCW radar apparatus.

CITATION LIST

Patent Literature

[PLT 1] JP-A-H07-151852

Technical Problem

Summary

Thus it is desired to detect noise which is always mixed with beat signals in an FMCW radar apparatus, with a method that has not been used in the conventional art.

According to a first aspect of the present disclosure, there is provided an FMCW radar apparatus that transmits a transmission signal including a first frequency-rise time period whose frequency sequentially rises with a first modulated gradient, a first frequency-fall time period whose frequency sequentially falls with the first modulated gradient, a second frequency-rise time period whose frequency sequentially rises with a second modulated gradient different from the first modulated gradient, and a second frequency-fall time period whose frequency sequentially falls with the second modulated gradient; a reception unit that receives a reception signal resulting from reflection of the transmission signal by a target and outputs beat signals based on the transmission signal and the reception signal; a control unit that detects a target on the basis of the beat signals; and a power supply bias circuit that supplies power-supply voltage to at least the transmission unit and the control unit, among the transmission unit, the reception unit and the control unit. The control unit includes: an acquiring portion acquiring the beat signals outputted by the reception unit; a peak frequency specifying portion specifying frequencies of a plurality of peaks respectively for the first frequency-rise time period, the first frequency-fall time period, the second frequency-rise time period and the second frequency-fall time period of the beat signals acquired by the acquiring portion; an oscillation determining portion determining whether or not oscillation conditions are satisfied; and a notifying portion notifying occurrence of oscillation in the power supply bias circuit on the basis of a determination that the oscillation conditions are satisfied, the determination being made by the oscillation determining portion. The oscillation determining portion uses, as objects, the plurality of peaks specified by the peak frequency specifying portion to determine that the oscillation conditions are satisfied, on the basis of a matter that, of groups each of which is formed by extracting peaks in a manner of extracting one from each of the first frequency-rise time period, the first frequency-fall time period, the second frequency-rise time period and the second frequency-fall time period, there is a group in which all peaks of the group are within the same frequency range.

In order to achieve the above objects, the inventors of the present invention recognized the importance of the following facts. When an actual identical target is detected in both of a part formed of the first frequency-rise time period and the first frequency-fall time period and a part formed of the second frequency-rise time period and the second frequency-fall time period, the distances (from the FMCW radar apparatus to the target) detected by the both are equal. However, when the modulation inclination is different between the former and the latter, the frequencies of the peaks of the beat signals are different between the former and the latter.

On the other hand, when oscillation is periodically caused in the power supply bias circuit and, resultantly, oscillation noise is superimposed on the beat signals, the beat signals include peaks corresponding to the influence of the oscillation noise. Such peaks are constantly generated, irrespective of the modulation inclinations. Accordingly, the frequencies of the peaks derived from the oscillation noise are equal in all of the first frequency-rise time period, the first frequency-fall time period, the second frequency-rise time period and the second frequency-fall time period.

In the first aspect, such differences in characteristics are used to make a determination that the oscillation conditions are satisfied, on the basis of a matter that, of the groups each of which is formed by extracting peaks in a manner of extracting one from each of the first frequency-rise time period, the first frequency-fall time period, the second frequency-rise time period and the second frequency-fall time period, there is a group in which all the peaks of the group are within the same frequency range. With this configuration, the noise constantly applied to the beat signals can be detected by a novel method that cannot be found in the conventional art.

According to another aspect of the FMCW radar apparatus, the apparatus includes: a transmission unit that transmits a transmission signal including a first frequency-rise time period whose frequency sequentially rises with a first modulated gradient, a first frequency-fall time period whose frequency sequentially falls with the first modulated gradient, and a varying portion whose frequency sequentially varies with a second modulated gradient different from the first modulated gradient; a reception unit that receives a reception signal resulting from reflection of the transmission signal by a target and outputs beat signals based on the transmission signal and the reception signal; a control unit that detects a target on the basis of the beat signals; and a power supply bias circuit that supplies power-supply voltage to at least the transmission unit and the control unit, among the transmission unit, the reception unit and the control unit. The control unit includes: an acquiring portion acquiring the beat signals outputted by the reception unit; a discrete Fourier transforming portion performing discrete Fourier transform for each of the first frequency-rise time period, the first frequency-fall time period and the varying portion to obtain frequency bin-intensity characteristics; an oscillation determining portion determining whether or not oscillation conditions are satisfied; and a notifying portion notifying occurrence of oscillation in the power supply bias circuit on the basis of a determination that the oscillation conditions are satisfied, the determination being made by the oscillation determining portion. The oscillation determining portion determines that the oscillation conditions are satisfied, on the basis of a determination that, of one or more groups each of which is formed by extracting peaks of beat signals in a manner of extracting one from either one of the first frequency-rise time period and the first frequency-fall time period and one from the varying portion, there is a group in which an amount obtained by multiplying a ratio between the first modulated gradient and the second modulated gradient with a frequency bin number of the one peak, and a frequency bin number of a peak of the varying portion of the group are within the same bin number range, the determination being based on the frequency bin-intensity characteristics obtained by the discrete Fourier transforming portion.

When an actual identical target is detected in both of a part formed of the first frequency-rise time period and the first frequency-fall time period and a part formed of the varying portion, the distances (from the FMCW radar apparatus to the target) detected by the both are equal. However, when the modulation inclination is different between the former and the latter, the frequencies of the peaks of the beat signals are different between the former and the latter. In terms of frequency bin number, an amount obtained by multiplying a ratio between the first modulated gradient and the second modulated gradient with the frequency bin number of the peak of either one of the first frequency-rise time period and the first frequency-fall time period is different from the frequency bin number of the peak of the varying portion.

On the other hand, when oscillation is periodically caused in the power supply bias circuit and, resultantly, oscillation noise is superimposed on the beat signals, the beat signals include peaks corresponding to the influence of the oscillation noise. Such peaks are constantly generated, irrespective of the modulation inclinations. Accordingly, for the peaks derived from the oscillation noise, the amount obtained by multiplying the ratio between the first modulated gradient and the second modulated gradient with the frequency bin number of the peak of either one of the first frequency-rise time period and the first frequency-fall time period is equal to the frequency bin number of the peak of the varying portion.

According to the configuration related to the above aspect, using such differences in characteristics, and based on the frequency bin-intensity characteristics of the beat signals, it is ensured that the oscillation conditions are determined to be satisfied on the basis of a determination that, of one or more groups each being formed by extracting the peaks of the beat signals in a manner of extracting one from either one of the first frequency-rise time period and the first frequency-fall time period and one from the varying portion, there is a group in which an amount obtained by multiplying the ratio between the first modulated gradient and the second modulated gradient with the frequency bin number of the peak of the one portion, and the frequency bin number of the peak of the varying portion of the group are within the same bin number range. With this configuration, the noise constantly applied to the beat signals can be detected by a novel method that cannot be found in the conventional art.

It should be noted that the bracketed reference signs in the above and in the claims indicate correlation of the terms recited in the claims with specific objects and the like exemplifying the terms in the embodiments described later.

BRIEF DESCRIPTION OF THE DRAWINGS

In the accompanying drawings:

FIG. 9 is a flow chart illustrating details of an oscillation determination process according to the second embodiment.

DESCRIPTION OF EMBODIMENTS

First Embodiment

Hereinafter is described a first embodiment of the present invention

Figure 1:
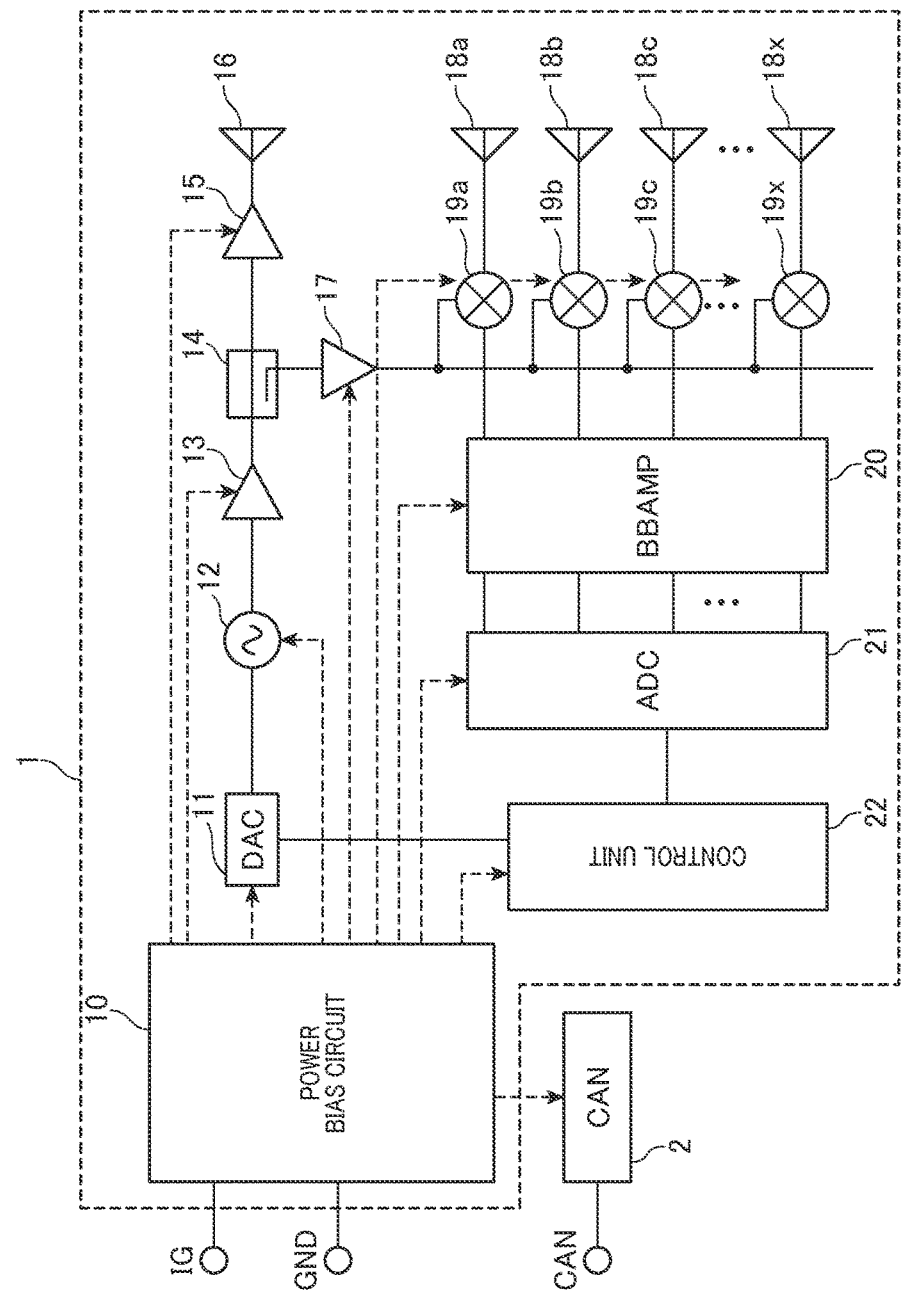
FIG. 1 is a block diagram illustrating an FMCW radar apparatus related to various embodiments of the present invention.

An FMCW radar apparatus 1 of the present embodiment shown in FIG. 1 is installed in a vehicle to radiate radio waves of a millimeter-wave band in a traveling direction of the vehicle, e.g. forward direction. The apparatus 1 receives the radio waves reflected by a target, such as a preceding vehicle or an obstacle, as incoming waves to calculate a distance from the own apparatus to the target, as well as a relative speed of the target relative to the own apparatus.

As shown in FIG. 1, the FMCW radar apparatus 1 for vehicle is installed in a vehicle. The FMCW radar apparatus 1 includes, as a transmission unit, a DAC (D/A converter) 11, VCO (voltage control oscillator) 12, BA (buffer amplifier) 13, distributor 14, PA (power amplifier) 15 and transmitting antenna 16. The FMCW radar apparatus 1 further includes, as a reception unit, a plurality of receiving antennas 18a, 18b, 18c to 18x, and a plurality of mixers 19a, 19b, 19c to 19x corresponding to the receiving antennas 18a, 18b, 18c to 18x on a one-to-one basis. Further, the FMCW radar apparatus 1 includes a BBAMP (base-band amplifier) 20, an ADC 21 and a control unit 22.

The vehicle includes CAN (controller area network) 2 as an in-vehicle LAN (local area network), the FMCW radar apparatus 1, and a power-supply bias circuit 10 that supplies power-supply voltage to the CAN 2. The power-supply bias circuit 10 is connected with an IG (ignition) line and a GND (ground) line of the vehicle. When the IG is set (turned on), the power-supply bias circuit 10 supplies a predetermined DC power-supply voltage such as to the components 11, 12, 13, 15, 17, 19, 20, and 22 of the FMCW radar apparatus 1, and the CAN 2.

It should be noted that the DC power-supply voltage has to be supplied to the transmission unit and the control unit without fail. However, depending on the circuit configuration, the reception unit does not have to be necessarily supplied with the DC power-supply voltage. The reception unit of the present embodiment, however, is configured to require the DC power-supply voltage.

The DAC 11 is a DA converter that converts a triangular-wave digital signal of a predetermined length inputted from the control unit 22 to an adjustment level of the VCO 12 and outputs the converted signal as a triangular-wave analog-modulated signal of a predetermined cycle.

The VCO 12 outputs a signal that has been frequency-modulated (corresponding to the normal signal) on the basis of the triangular-wave analog-modulated signal inputted from the DAC 11. The BA 13 amplifies this signal and outputs the amplified signal. The signal outputted from the VCO 12 is a millimeter-wave band signal (e.g., signal having a center frequency of 76.5 and a frequency variation width of 300 MHz). More specifically, the signal has a rise portion where the frequency linearly and sequentially rises in synchrony with the inputted triangular-wave analog-modulated signal, and a fall portion where the frequency linearly and sequentially falls immediately following the rise portion.

The distributor 14 distributes power of the signal outputted from the BA 13 into two directions to generate a local signal and a transmission signal. The transmission signal from the distributor 14 is inputted to the PA 15 for amplification, while the local signal is ensured to be amplified in an LA 17 and inputted to the plurality of mixers 19a to 19x.

The transmission signal amplified by the PA 15 is inputted to the antenna 16. Thus, the antenna 16 transmits a millimeter-wave signal having a rise portion where the frequency linearly and sequentially rises and a fall portion where the frequency linearly and sequentially falls immediately following the rise portion.

The plurality of receiving antennas 18a to 18x are arranged being juxtaposed in a horizontal direction to configure a single array antenna as a whole. The plurality of receiving antennas 18a to 18x each receive a reception signal that is a signal as a result of being transmitted from the transmitting antenna 16 and reflected by an object.

The plurality of mixers 19a to 19x each mix the reception signal received by the corresponding one of the receiving antenna, with the local signal transmitted from the distributor 14 to generate and output a well-known beat signal. The frequency of the beat signal generated then is what is called a beat frequency. The beat frequency in the rise portion of the transmission signal where the frequency rises is called a rising-modulation-time beat frequency, while the beat frequency in the fall portion of the transmission signal where the frequency falls is called a falling-modulation-time beat frequency. The beat frequency is used for calculating a distance to an object and a relative speed of the object on the basis of an FMCW method.

The BBAMP 20 amplifies each of the beat signals outputted from the plurality of mixers 19a to 19x and inputs the amplified signals to the ADC 21. The ADC 21 is an AD converter that converts the beat signals inputted from the BBAMP 20 and inputs the converted signals to the control unit 22.

The control unit 22 inputs a triangular-wave digital signal of a predetermined period to the DAC 11, as mentioned above, at periodically and repeatedly generated predetermined sampling timing. At the same time, the control unit 22 acquires the beat signals inputted from the ADC 21 to perform a process described later. As a result of the process, the control unit 22 detects a distance from the own apparatus to a target, an azimuth of the target as viewed from the own apparatus, and a relative speed of the target relative to the own apparatus. The distance, the azimuth and the relative speed are transmitted to in-vehicle devices, such as a pre-crash control ECU, via the CAN 2.

The description below is focused on an operation of the FMCW radar apparatus 1 having the configuration as described above. The control unit 22 inputs a triangular-wave digital signal of a predetermined cycle to the DAC 11, as mentioned above, at each predetermined sampling timing that periodically and repeatedly arrives.

However, the inputted triangular-wave digital signal is a two-sweep signal that includes sweeps twice in each of which intensity increases once and decreases once. Specifically, the inputted triangular-wave digital signal includes a first kind triangular-wave digital signal and a second kind triangular-wave digital signal in this order.

Figure 2:
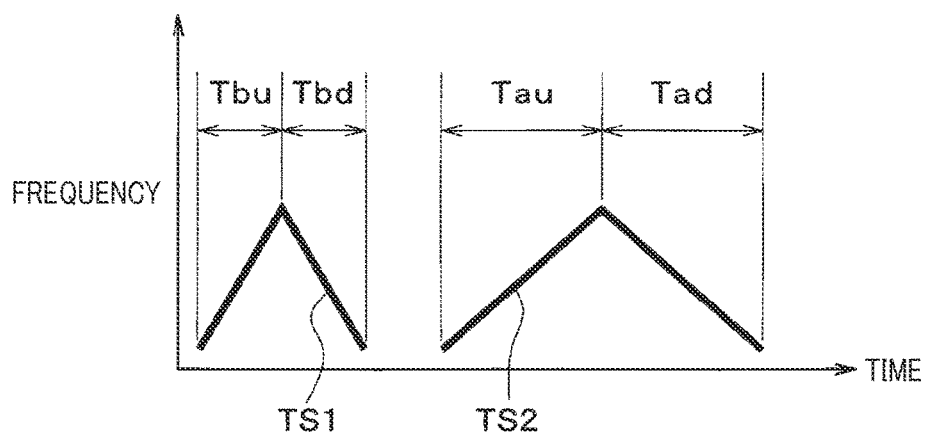
FIG. 2 is a diagram illustrating first sub-modulated signals TS1 and TS2.

As a result, as shown in FIG. 2, the modulated signal (transmission signal and local signal) outputted from the BA 13 becomes two kinds of sub-modulated signals TS1 and TS2. In other words, at one sampling timing, the BA 13 outputs a first sub-modulated signal TS1 corresponding to the first kind triangular-wave digital signal, and a second sub-modulated signal TS2 corresponding to the second kind triangular-wave digital signal, in this order. There is a time interval of about 5 msec or shorter from an output end of the first sub-modulated signal TS1 to an output start of the second sub-modulated signal TS2.

Let us explain now the difference between the first and second sub-modulated signals TS1 and TS2. The first and second sub-modulated signals TS1 and TS2 have rise times Tbu and Tau, respectively, which are different from each other, and also have fall times Tbd and Tad, respectively, which are different from each other.

The rise times Tbu and Tau refer to time durations of sections where the frequency rises (reception data acquisition times) in the sub-modulated signals ST1 and ST2, respectively. Also, the fall times Tbd and Tad refer to time durations of sections where the frequency falls (reception data acquisition times) in the sub-modulated signals ST1 and ST2, respectively.

More specifically, the rise time Tbu of the modulated signal TS1 is shorter than the rise time Tau of the modulated signal TS2, and the fall time Tbd of the modulated signal TS1 is shorter than the fall time Tad of the modulated signals TS2.

In the present embodiment, as an example, Tbu, Tbd, Tau and Tad are 0.5 ms, 0.5 ms, 1 ms and 1 ms, respectively. Also, the sub-modulated signals TS1 and TS2 have the same frequency variation width (difference between a maximum and a minimum of frequency) of 300 MHz.

The control unit 22 inputs a triangular-wave digital signal of a predetermined cycle to the DAC 11 as mentioned above, while performing a process shown in FIG. 3. The process of FIG. 3 is also performed at every sampling timing by the control unit 22.

Figure 3:
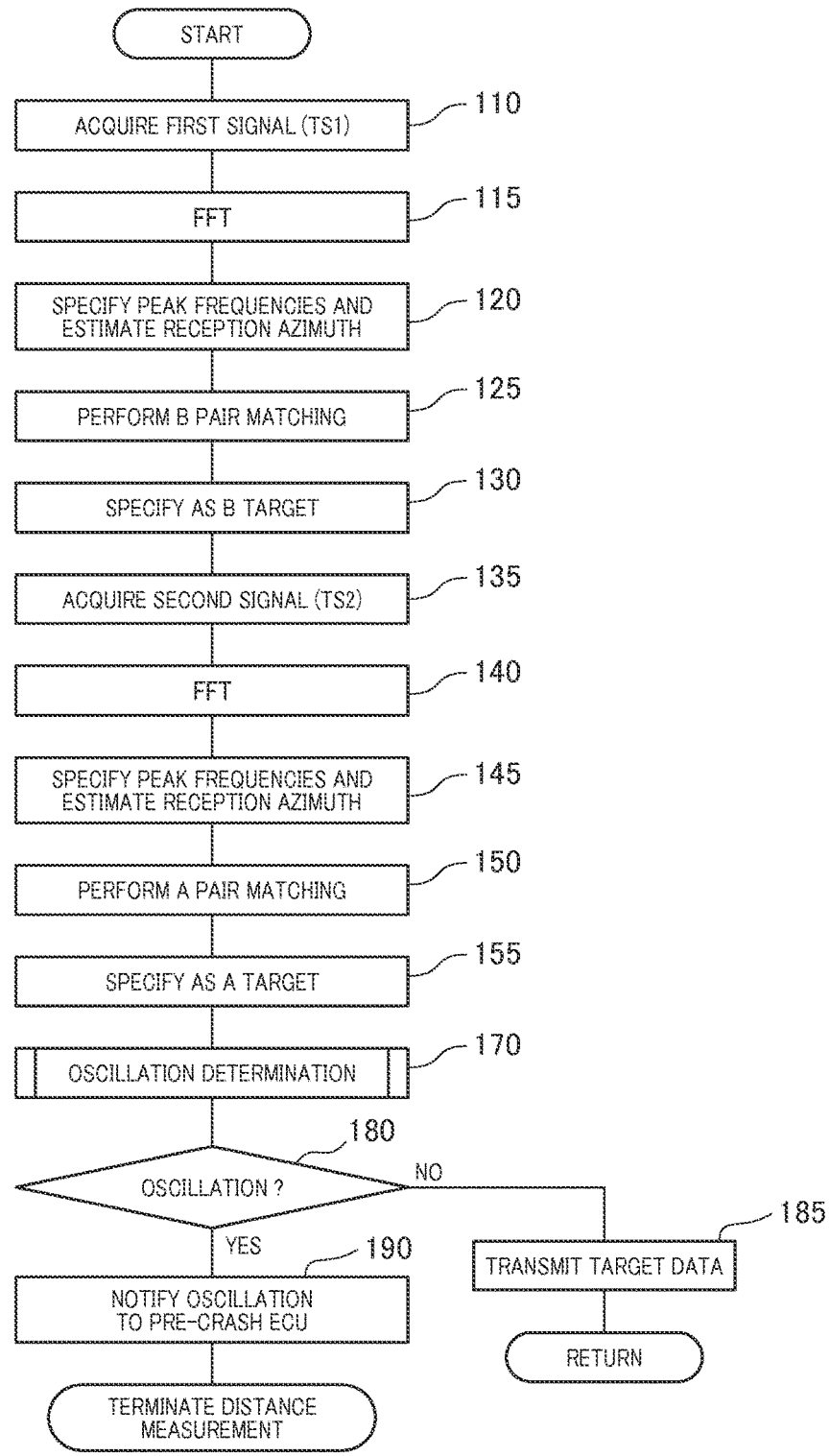
FIG. 3 is a flow chart illustrating a process performed by a control unit in a first embodiment.

In the process of FIG. 3, at step 110 first, the control unit 22 acquires a beat signal of each of channels inputted from the ADC 21 in the rise time Tbu and the fall time Tbd, as a beat signal corresponding to the first sub-modulated signal TS1.

The channels, as a concept, correspond one-to-one to the plurality of receiving antennas configuring the array antenna. For example, the beat signal of the channel of the receiving antenna 18a is generated from a reception signal received by the receiving antenna 18a. It should be noted that each acquired beat signal is a one-sweep signal in the rise time Tbu (i.e. first frequency-rise time period) and the fall time Tbd (i.e. first frequency-fall time period).

Then, control proceeds to step 115 where the control unit 22 applies high-speed Fourier transform (FFT corresponding to an example of the discrete Fourier transform) to the portion of the rise time Tbu and the portion of the fall time Tbd of the beat signal of each channel. Thus, frequency-intensity characteristics of the rise time Tbu (first frequency-rise time period) and frequency-intensity characteristics of the fall time Tbd (first frequency-fall time period) can be obtained for each channel.

Then, at step 120, the control unit 22 specifies one peak frequency (the same number as a total number of targets) for each target (which may be zero, one, or two or more) in the first frequency-rise time period, on the basis of the frequency-intensity characteristics of the first frequency-rise time period of each channel obtained at step 115, and estimates a reception azimuth corresponding to the peak frequency (the azimuth corresponding to an azimuth of the corresponding target).

Further, the control unit 22 specifies one peak frequency for each target (which may be zero, one, or two or more; the number of peaks is the same as that of targets) in the first frequency-fall time period, on the basis of the frequency-intensity characteristics of the first frequency-fall time period of each channel obtained at step 115, and estimates a reception azimuth corresponding to the peak frequency (the azimuth corresponding to an azimuth of the corresponding target).

In the estimation of an azimuth at step 120, a well-known DBF (digital beam forming) technique is used.

Then, at step 125, pair matching is performed. Specifically, the control unit 22 extracts a pair of peak frequencies corresponding to an identical target, from among the peak frequencies in the first frequency-rise time periods and those in the first frequency-fall time periods specified at step 120 (the pair consisting of one peak frequency in the first frequency-fall time periods and one peak frequency in the first frequency-rise time periods, the pair being hereinafter also referred to as B pair). The number of extracted B pairs is equal to the number of targets. Accordingly, if there are a plurality of targets, the plurality of pairs are extracted.

A method of pair matching that can be used includes, for example, a method of extracting a history-linked pair in which the peak frequencies have a difference in the intensity of the beat signals (i.e. peak intensity) within a predetermined intensity range, and the reception azimuths corresponding to the respective peak frequencies are within a predetermined azimuth range, and the peak frequencies are approximate to the frequencies estimated from measurement data of the previous sampling timing.

Specifically, one peak Y is selected from the first frequency-rise time period, and then, the peaks in the first frequency-fall time periods, whose difference in the reception azimuth from the peak Y is within a predetermined azimuth range and whose difference in peak intensity from the peak Y is within a predetermined intensity range, are all extracted (excepting the ones that have been removed as described below). Of the extracted peaks, a peak Z whose peak intensity is most approximate to that of the peak Y is selected. The peaks Y and Z are paired and the peak Z is removed from the objects of extraction. This procedure is repeated by a predetermined number of times (e.g., extraction is performed for 64 times in the first frequency-rise time period in descending order of peak intensity).

Then, at step 130, a target is specified for each of the B pairs extracted at step 125. In specifying a target, the peak frequencies of a B pair as an object are used as bases to calculate a distance from the own apparatus to a target that corresponds to the B pair as an object, a relative speed of the target relative to the own apparatus, and an azimuth of the target as viewed from the own apparatus, and the results of the calculation are used as target data of the B pair in question. Each of the targets specified at step 130 (each target corresponding to the B pair for which target-specified data have been prepared) is referred to as a B target.

A well-known method is used for calculating the distance and the relative speed on the basis of the peak frequencies to be paired in the first frequency-rise time period and the first frequency-fall time period. Specifically, when the peak frequency in the first frequency-rise time period is fbu, and the peak frequency in the first frequency-fall time period is fbd, a distance D and a relative speed V are as expressed by the following formulas.

$$D=C \cdot (fbu+fbd)/2(\Delta Fb/Tbu+\Delta Fb/Tbd) \qquad \text{(Formula 1)}$$

$$V=C \cdot (fbu-fbd \cdot Tbd/Tbu)/\{2 \cdot fOb(1+Tbd/Tbu)\} \qquad \text{(Formula 2)}$$

In the formulas, $\Delta Fb$ is a frequency variation width of a transmission signal (i.e. the first sub-modulated signal TS1), fOb is a center frequency of the transmission signal, and C is a light velocity. In the present embodiment, as an example, $\Delta Fb$=300 MHz, Tbu=Tdb=0.5 ms, and fOb=76.5 GHz.

A method that can be used for calculating the azimuth on the basis of the peak frequencies to be paired in the first frequency-rise time period and the first frequency-fall time period includes, for example, a method of using an average value of the azimuths estimated at step 120 in respect of the two peak frequencies.

Then, at step 135, the control unit 22 acquires a beat signal of each channel inputted from the ADC 21, in the rise time Tau and the fall time Tad, as a beat signal corresponding to the second sub-modulated signal TS2. It should be noted that each acquired beat signal is a one-sweep signal in the rise time Tau (i.e. second frequency-rise time period) and the fall time Tad (i.e. second frequency-fall time period).

Then, control proceeds to step 140 where the control unit 22 independently applies FFT to the portion of the rise time Tau and the portion of the fall time Tad of the beat signal of each channel. Thus, frequency-intensity characteristics of the rise time Tau (second frequency-rise time period) and frequency-intensity characteristics of the fall time Tad (second frequency-fall time period) can be obtained for each channel.

Then, at step 145, based on the frequency-intensity characteristics in the second frequency-rise time period of each channel obtained at step 140, the control unit 22 specifies one peak frequency (the same number as a total number of targets) for each target (which may be zero, one, or two or more), and estimates a reception azimuth corresponding to the peak frequency (the azimuth corresponding to an azimuth of the corresponding target).

Further, based on the frequency-intensity characteristics of the second frequency-fall time period of each channel obtained at step 140, the control unit 22 specifies one peak frequency (the same number as a total number of targets) for each target (which may be zero, one, or two or more), and estimates a reception azimuth corresponding to the peak frequency (the azimuth corresponding to an azimuth of the corresponding target).

In estimating an azimuth at step 145 as well, a well-known DBF (digital beam forming) technique is used.

Then, at step 150, pair matching is performed. Specifically, the control unit 22 extracts a pair of peak frequencies corresponding to an identical target, from among the peak frequencies in the second frequency-rise time periods and those in the second frequency-fall time periods specified at step 145 (the pair consisting of one peak frequency in the second frequency-fall time periods and one peak frequency in the second frequency-rise time periods, the pair being hereinafter also referred to as A pair). A method of pair matching equivalent to the one used at step 125 is adopted.

Then, at step 155, a target is specified for each of the A pairs extracted at step 150. In specifying a target, the peak frequencies of an A pair as an object are used as bases to calculate a distance from the own apparatus to a target that corresponds to the A pair as an object, a relative speed of the target relative to the own apparatus, and an azimuth of the target as viewed from the own apparatus, and the results of the calculation are used as target data of the A pair in question. Each of the targets specified at step 155 (each target corresponding to the A pair for which target-specified data have been prepared) is referred to as A target.

A well-known method is used for calculating the distance and the relative speed on the basis of the peak frequencies to be paired in the second frequency-rise time period and the second frequency-fall time period. Specifically, when the peak frequency in the second frequency-rise time period is fau, and the peak frequency in the second frequency-fall time period is fad, a distance D and a relative speed V are as expressed by the following formulas.

$$D = C \cdot (fau+fad)/2(\Delta Fa/Tau+\Delta Fa/Tad) \qquad \text{(Formula 3)}$$

$$V = C \cdot (fau-fad \cdot Tad/Tau)/\{2 \cdot fOa(1+Tad/Tau)\} \qquad \text{(Formula 4)}$$

In the formulas, $\Delta Fa$ is a frequency variation width of a transmission signal (i.e. the second sub-modulated signal TS2), fOa is a center frequency of the transmission signal, and C is a light velocity. In the present embodiment, as an example, $\Delta Fb = \Delta Fa = 300$ MHz, Tau=Tad=1.0 ms, and fOb=fOa=76.5 GHz.

When an identical actual target is detected from both of a beat signal based on the first sub-modulated signal ST1 and a beat signal based on the second sub-modulated signal TS2 at one sampling timing, the distances D detected from the both are identical. However, when a value derived from (Tbu+Tbd)/8$\Delta Fb$ is different from a value derived from (Tau+Tad)/8$\Delta Fa$, a value derived from fbu+fbd is different from a value derived from fau+fad.

As a matter of fact, $\Delta Fb$ and $\Delta Fa$ have the same value in the present embodiment. However, since Tbu+Tbd is smaller than Tau+Tad, a relation (Tbu+Tbd)/8$\Delta Fb$<(Tau+Tad)/8$\Delta Fa$ is established. In other words, a first modulated gradient $\Delta Fb$/Tbu (=$\Delta Fb$/Tbd) is different from a second modulated gradient $\Delta Fa$/Tau (=$\Delta Fa$/Tad).

Figure 4:
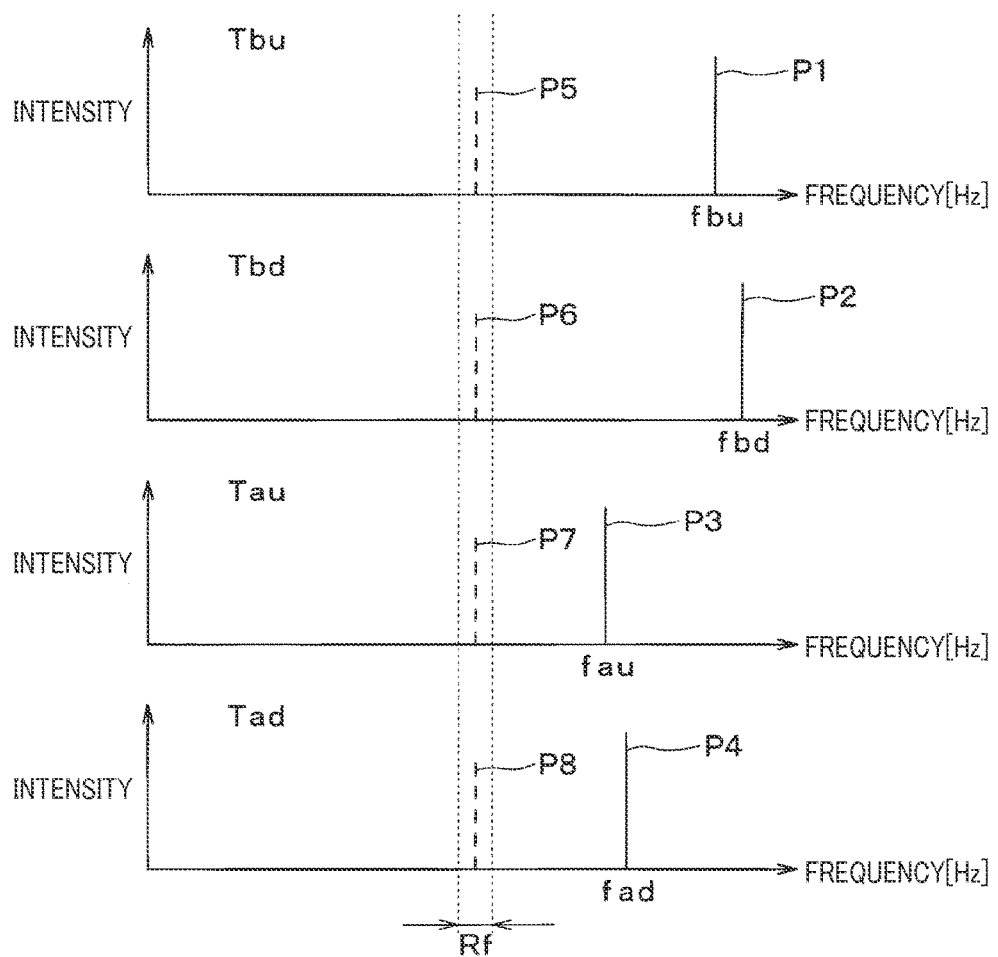
FIG. 4 is a graph illustrating a frequency-intensity relationship of beat signals acquired in time durations Tbu, Tbd, Tau and Tad of a modulated signal.

Accordingly, when an identical actual target is detected at one sampling timing from both of the beat signals based on the first and second sub-modulated signals TS1 and TS2, fbu+fbd>fau+fad is satisfied. FIG. 4 is a graph illustrating a frequency-intensity relationship of the beat signals acquired in the rise time (first frequency-rise time period) Tbu and the fall time (first frequency-fall time period) Tbd of the first sub-modulated signal TS1, and in the rise time (second frequency-rise time period) Tau and the fall time (second frequency-fall time period) Tad of the second sub-modulated signal TS2. Peaks P1 to P4 in FIG. 4 are of an identical target (actually present object) and satisfy the above relation fbu+fbd>fau+fad as mentioned above.

Description so far has been focused on the case where the noise derived from the power supply bias circuit 10 is not superimposed on the beat signals. The following description is focused on the case where oscillation is periodically generated in the power supply bias circuit 10 and, resultantly, oscillation noise is superimposed on a supply voltage provided to at least a BB system (covering from the mixer output to the ADC 21, e.g. ADC 21) among the BB system, a reception system, a BA system and a PA system.

The BB system includes the BBAMP 20, the ADC 21 and the control unit 22. The reception system includes a local amplifier 17, the receiving antennas 18a to 18x and the mixers 19a to 19x. A modulation system includes the DAC 11 and the VCO 12. The BA system includes the BA 13. The PA system includes the PA 15.

In this case, as shown in FIG. 4, the beat signals in the portions Tbu, Tbd, Tau and Tad include not only the peaks P1 to P4 derived from normal signals but also peaks P5 to P8 corresponding to the influence of the oscillation noise. The peaks P5 to P8 are constantly generated, irrespective of the modulation inclinations of the sub-modulated signals TS1 and TS2. Accordingly, the frequencies of the peaks P5 to P8 are the same in all of Tbu, Tbd, Tau and Tad.

Of the peaks P5 to P8, the peaks P5 and P6 are paired in the pair matching performed at step 125. This is because the peak intensities of the both are substantially the same, and the reception azimuths of the both are substantially the same, and in addition, the both are constantly generated. For the same reasons, the peaks P7 and P8 are paired in the pair matching performed at step 150.

Subsequent to step 155, control proceeds to step 170 where oscillation determination is performed. In the oscillation determination, the control unit 22 determines, as mentioned above, whether or not the oscillation noise derived from the oscillation of the power supply bias circuit 10 has been superimposed on the supply voltage provided to the BB system.

Figure 5:
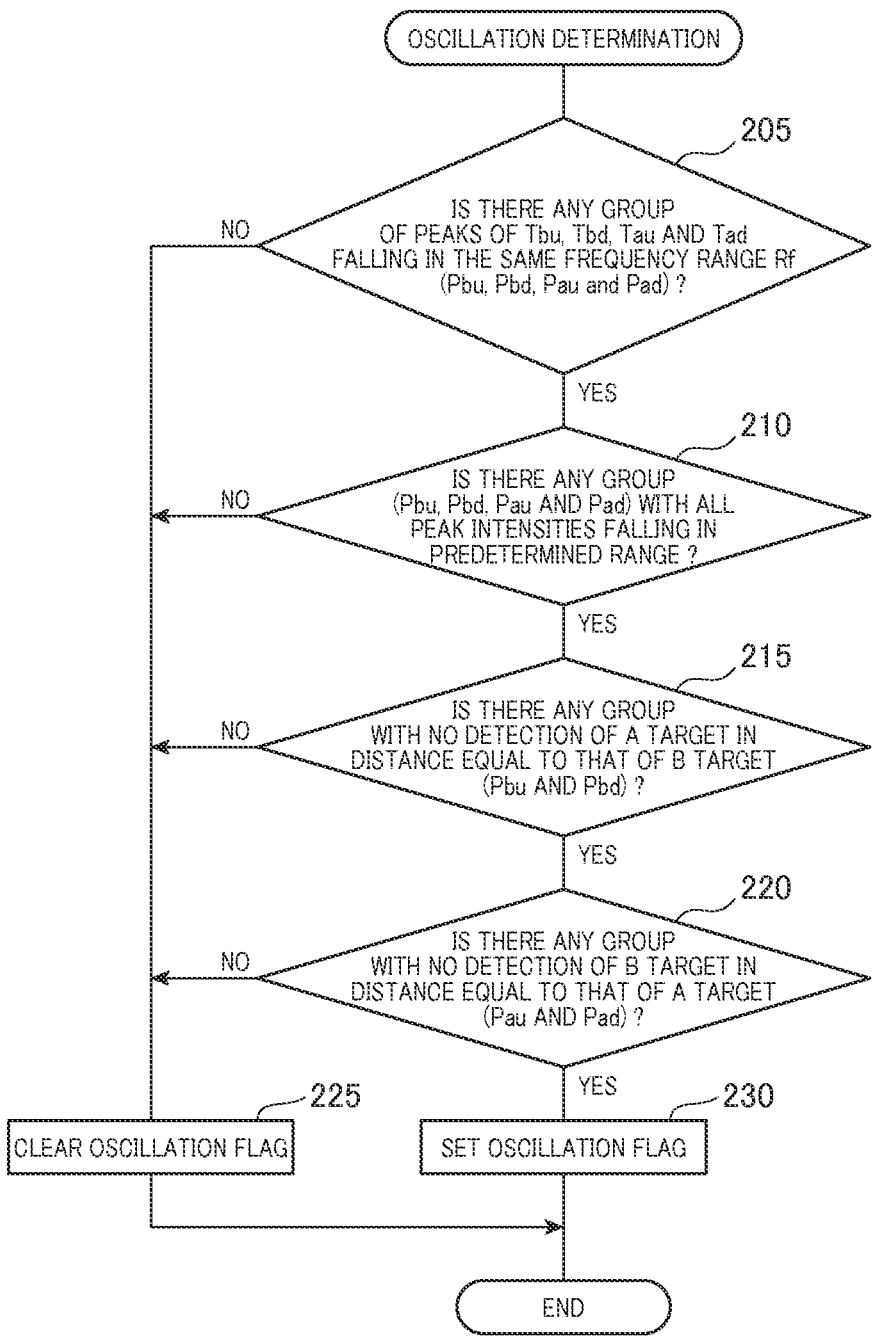
FIG. 5 is a flow chart illustrating details of an oscillation determination process according to the first embodiment.

In the oscillation determination, as shown in FIG. 5, the control unit 22 determines, at step 205 first, whether or not there are groups, among groups of beat signal peaks that are extracted in a manner of extracting one peak from each of the portions Tbu, Tbd, Tau and Tad (the groups may be zero, one, or two or more), in each of which all of the peaks of the group fall within the same frequency range Rf. This determination is based on differences in the characteristics of the peaks P1 to P4 of the beat signals derived from the normal signals, from the peaks P5 to P8 of the beat signals derived from the bias circuit 10.

For example, peaks of the beat signals are extracted in a manner of extracting one from each of the portions Tbu, Tbd, Tau and Tad to form a group. Such groups are formed as many as possible within a range of not breaking up the matched pairs acquired at steps 125 and 150. For each of the formed groups, a width from a lowest peak frequency to a highest peak frequency in the group is calculated to determine whether or not the calculated width is not more than the frequency range Rf. If there are one or more groups in which the calculated width is not more than the frequency range Rf, it is determined that there are groups falling in the same frequency range Rf.

The peak frequencies in the oscillation noise derived from the power supply bias circuit 10 should substantially completely coincide in the respective portions Tbu, Tbd, Tau and Tad. Therefore, the width of the frequency range Rf is desirably equivalent to the frequency resolution in the signal processing of the present radar. In the example of the present embodiment, the width is not more than Rf=2/Tbu [Hz].

Taking an example shown in FIG. 4, at step 205, a group of the peaks P5, P6, P7 and P8 alone is of the same frequency range Rf, but other groups (i.e. a group of the peaks P1, P2, P3 and P4, a group of the peaks P1, P2, P7 and P8, and a group of the peaks P5, P6, P3 and P4) are not of the same frequency range Rf.

As a result, at step 205, it is determined that there is a group of the same frequency range Rf, and then control proceeds to step 210. Hereinafter, a group of peaks which is determined to be of the same frequency range Rf is referred to as a group of peaks Pbu, Pbd, Pau and Pad.

Unlike the example shown in FIG. 4, in the absence of the oscillation noise derived from the oscillation of the power supply bias circuit 10, the peaks P1, P2, P3 and P4 forming a sole group do not fall within the same frequency range Rf. Accordingly, it is determined, at step 205, that there is no group that falls within the same frequency range Rf, and then control proceeds to step 225 where an oscillation flag is cleared, thereby terminating the oscillation determination.

At step 210, among one or more groups of peaks Pbu, Pbd, Pau and Pad which have been determined to fall within the same frequency range Rf, the controller 22 determines whether or not there is any group of the peaks Pbu, Pbd, Pau and Pad which have peak intensities falling within a predetermined peak intensity range.

As a matter of fact, the determination made at step 210 is performed taking account of the case where detection of a plurality of actual targets at one sampling timing can invite coincidence in the frequencies of the peaks corresponding to different targets.

Figure 6:
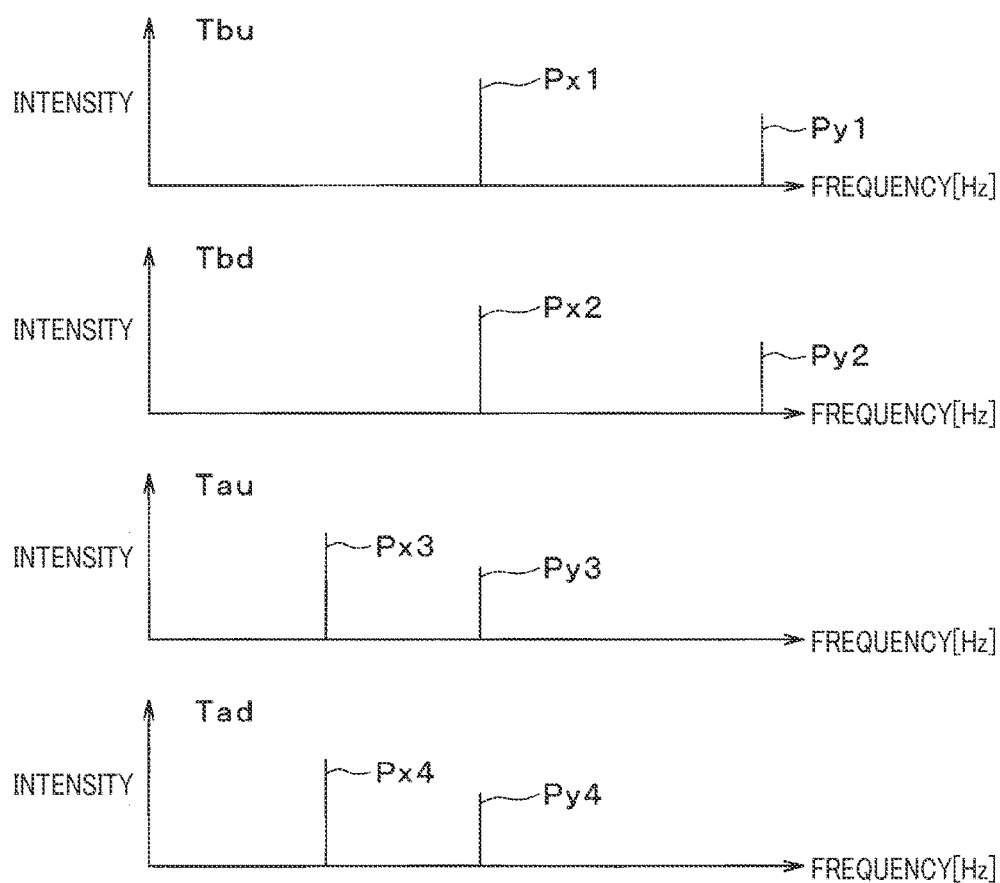
FIG. 6 is a graph illustrating incidental coincidence of peak frequencies Px1, Px2, Py3 and Py4 of different targets.

Referring to FIG. 6, hereinafter is described a typical situation where the frequencies of the peaks corresponding to different targets happen to coincide. Two targets X and Y are located at different distances Dx and Dy, respectively, from the FMCW radar apparatus 1, and a relative speed V relative to the FMCW radar apparatus 1 is zero.

In this case, as will be understood from the above Formulas 1 and 4, as to peaks Px1 to Px4 corresponding to the target X, the frequency of the peak Px1 in the rise time (first frequency-rise time period) Tbu of the first sub-modulated signal TS1 has the same value as that of the peak Px2 in the fall time (first frequency-fall time period) Tbd thereof. Similarly, the frequency of the peak Px3 in the rise time (second frequency-rise time period) Tau of the second sub-modulated signal TS2 has the same value as that of the peak Px4 in the fall time (second frequency-fall time period) Tad thereof.

Similarly, as to peaks Py1 to Py4 corresponding to the target Y, the frequency of the peak Py1 in the rise time (first frequency-rise time period) Tbu of the first sub-modulated signal TS1 has the same value as that of the peak Py2 in the fall time (first frequency-fall time period) Tbd thereof. Similarly, the frequency of the peak Py3 in the rise time (second frequency-rise time period) Tau of the second sub-modulated signal TS2 has the same value as that of the peak Py4 in the fall time (second frequency-fall time period) Tad thereof.

However, as to the target X, the peaks Px1 and Px2 corresponding to the first sub-modulated signal TS1 are not the same as the peaks Px3 and Px4 corresponding to the second sub-modulated signal TS2. Similarly, as to the target Y, the peaks Py1 and Py2 corresponding to the first sub-modulated signal TS1 are not the same as the peaks Py3 and Py4 corresponding to the second sub-modulated signal TS2. This is because the first modulated gradient (i.e. $\Delta Fb/Tbu=\Delta Fb/Tbd$) of the first sub-modulated signal TS1 is different from the second modulated gradient (i.e. $\Delta Fa/Tau=\Delta Fa/Tad$) of the second sub-modulated signal TS2.

Accordingly, depending on the case, as shown in FIG. 6, the peaks Px1 and Px2 corresponding to the target X and the peaks Py3 and Py4 corresponding to the target Y can all have the same frequency. In such a case, at step 205, the control unit 22 may determine that a group falling in the same frequency range Rf is present.

However, in this case as well, the intensities of the peaks Px1 and Px2 corresponding to the target X are unlikely to be equal to those of the peaks Py3 and Py4 corresponding to the target Y. This is because the distances Dx and Dy are different from each other between the targets X and Y. In order for the peak intensities to be equal between the distances Dx and Dy in spite of their being different from each other, the targets X and Y are required to have respective radar-reflective cross sectional areas in conformity with the ratio between the distances. However, such a correlation is seldom established.

On the other hand, the path through which the oscillation of the bias circuit 10 is superimposed on the BB system remains unchanged, irrespective of the modulation inclinations of the sub-modulated signals TS1 and TS2 (i.e. $\Delta Fb/Tbu$, $\Delta Fb/Tbd$, $\Delta Fa/Tau$ and $\Delta Fa/Tad$). Accordingly, the peak intensities of the peaks P5 to P8 of the beat signals derived from the oscillation noise (see FIG. 4) are the same, irrespective of the modulation inclinations.

From this point of view, the control unit 22 is ensured to determine, as at step 210, whether or not the peak intensities of all the peaks Pbu, Pbd, Pau, Pad in a group are within a predetermined peak intensity range, in respect of each of the groups of peaks Pbu, Pbd, Pau and Pad that are determined to fall within the same frequency range Rf. It should be noted that the predetermined peak intensity range may be one that covers substantially the same values. For example, the range may cover from the lowest peak intensity among the group of peaks Pbu, Pbd, Pau and Pad subjected to determination, to an intensity obtained by adding 1 dB to the lowest peak intensity.

At step 210, if it is determined that there is at least one group in which all the peaks Pbu, Pbd, Pau and Pad of the group are in the predetermined peak intensity range, among the groups of peaks which are determined to be in the same frequency range Rf, control proceeds to step 215. FIG. 4 shows an example of such a case.

If the control unit 22 determines that none of the peaks Pbu, Pbd, Pau and Pad in a group are within the predetermined peak intensity range, in respect of all the groups of peaks that are determined to be in the same frequency range Rf, control proceeds to step 225. FIG. 6 shows an example of such a case. At step 225, the oscillation flag is cleared and then the oscillation determination is terminated.

Thus, applying the criterion as used at step 210 to the oscillation determination, the probability of erroneously detecting oscillation of the power supply bias circuit 10 can be lowered, compared to the case where the oscillation flag is set (i.e., turned on) whenever there is spectrum having frequencies that coincide in all the modulation inclinations.

At step 215, the groups of peaks Pbu, Pbd Pau and Pad falling within the same frequency range Rf and having the same peak intensity are subjected to the determination which is performed as follows.

First, the control unit 22 extracts the peaks Pbu and Pbd corresponding to the B target that has been specified as a target at step 130 from a group of peaks subjected to determination. Then, the control unit 22 searches for a target having the distance D that is the same (within a predetermined error range) as the distance D obtained from the frequencies of these peaks Pbu and Pbd by using Formula 1, through the A targets that have been specified as targets at step 155, thereby determining the presence/absence of such a target.

If there is such a target among the A targets, the peaks Pbu (e.g., peak P5) and Pbd (e.g., peak P6) have a high probability of being the peaks corresponding to an actual target, i.e. the peaks derived from the normal signals, not from noise. Contrarily, if there is no such a target among the A targets, the peaks Pbu and Pbd have a very high probability of being the peaks not corresponding to an actual target, i.e. very high probability of being noise.

Accordingly, if such a target is determined to be present among the A targets, in respect of all the groups of peaks subjected to determination, control proceeds to step 225 where the oscillation flag is cleared and then the oscillation determination is terminated. On the other hand, if such a target is determined not to be present among the A targets, in respect of one or more groups of peaks subjected to determination, control proceeds to step 220.

At step 220, each group of peaks Pbu, Pbd Pau and Pad of the same frequency range Rf and having the same peak intensity, and having no A target whose distance D is the same (within a predetermined error range) as that of the corresponding B target is subjected to the determination which is performed as follows.

First, the control unit 22 extracts the peaks Pau and Pad corresponding to the A target that has been specified as a target at step 155 from a group of peaks subjected to determination. Then, the control unit 22 searches for a target having the distance D that is the same (within a predetermined error range) as the distance D obtained from the frequencies of these peaks Pau and Pad by using Formula 3, through the B targets that have been specified as targets at step 130, thereby determining the presence/absence of such a target.

If there is such a target among the B targets, the peaks Pau (e.g., peak P7) and Pad (e.g., peak P8) have a high probability of being the peaks corresponding to an actual target, i.e. the peaks derived from the normal signals, not from noise. Contrarily, if there is no such a target among the B targets, the peaks Pau and Pad have a very high probability of being peaks not corresponding to an actual target, i.e. very high probability of being noise.

Accordingly, if such a target is determined to be present in the B targets, in respect of all the groups of peaks subjected to determination, the oscillation flag is cleared (i.e., turned off) and then the oscillation determination is terminated. On the other hand, if such a target is determined not to be present in the B targets, in respect of one or more groups of peaks subjected to determination, control proceeds to step 230 where the oscillation flag is set and then the oscillation determination is terminated. Applying criteria as used at steps 215 and 220, the probability of erroneously turning off the oscillation flag is further lowered.

Subsequent to the oscillation determination at step 170, control proceeds to step 180 where the control unit 22 determines as to the presence/absence of oscillation in the power supply bias circuit 10 on the basis of the results of the oscillation determination. Specifically, if the oscillation flag is set (turned on), oscillation is determined to be present in the power supply bias circuit 10 and control proceeds to step 190. If the oscillation flag is cleared (turned off), no oscillation is determined to be present in the power supply bias circuit 10 and control proceeds to step 185.

At step 185, the control unit 22 transmits target data resulting from grouping at the immediately preceding step 160 (the target data may be of only the A target, or only the B target, or both of A and B targets) to the pre-crash control ECU via the CAN 2.

Upon reception of the target data, the pre-crash control ECU performs well-known pre-crash control. For example, it is determines whether or not a target that is approaching at a speed of not less than a predetermined relative speed is present in a predetermined distance from the FMCW radar 1. Only when there is such a target, automatic braking is applied, a pretensioner is activated, an audible warning is outputted, or the like, in preparation for the collision with the target in question. After step 183, control waits until the next sampling timing, and then returns to step 110.

At step 190, the control unit 22 transmits a signal indicating the presence of oscillation in the power supply bias circuit 10 to the pre-crash control ECU, for example, via the CAN 2. Upon reception of the signal, the pre-crash control ECU may warn the occupants of the vehicle about the abnormality. After step 190, the distance measurement is terminated because there is a high probability of performing erroneous detection due to the abnormality in the power supply bias circuit 10. In other words, the process (e.g. preparation and transmission of target data) of FIG. 3 is not repeated any more.

As described above, in the present embodiment, the control unit 22 determines, at step 170, whether or not predetermined oscillation conditions are satisfied. If the conditions are satisfied, an oscillation flag is set (turned on), and if not, the oscillation flag is cleared (turned off).

The predetermined oscillation conditions include all of condition 1 adopted at step 205 described above, condition 2 adopted at step 210, condition 3 adopted at step 215, and condition 4 adopted at step 220, as requirements.

Particularly, the adopted condition 1 is that the groups each prepared by extracting peaks of beat signals, in a manner of extracting one from each of the first frequency-rise time period Tbu, the first frequency-fall time period Tbd, the second frequency-rise time period Tau and the second frequency-fall time period Tad, include a group in which all the peaks of the group are in the same frequency range Rf. Accordingly, the noise constantly applied to the beat signals can be detected by means of a novel method that cannot be found in the conventional art.

Second Embodiment

Hereinafter is described a second embodiment of the present invention. The present embodiment is different from the first embodiment only in that the process shown in FIG. 3 performed by the control unit 22 at every sampling timing has been changed to the process shown in FIG. 7. The hardware configuration of the FMCW radar apparatus 1 is the same as the one in the first embodiment.

The following description on the operation of the FMCW radar apparatus 1 of the present embodiment is focused on the part different from the first embodiment. The triangular-wave digital signal inputted to the DAC 11 by the control unit 22 at each sampling timing is the same as the one in the first embodiment. Accordingly, similar to the first embodiment, the modulated signals (transmission signal and local signal) outputted from the BA 13 at each sampling timing are also two kinds of sub-modulated signals TS1 and TS2 shown in FIG. 2.

Figure 7:
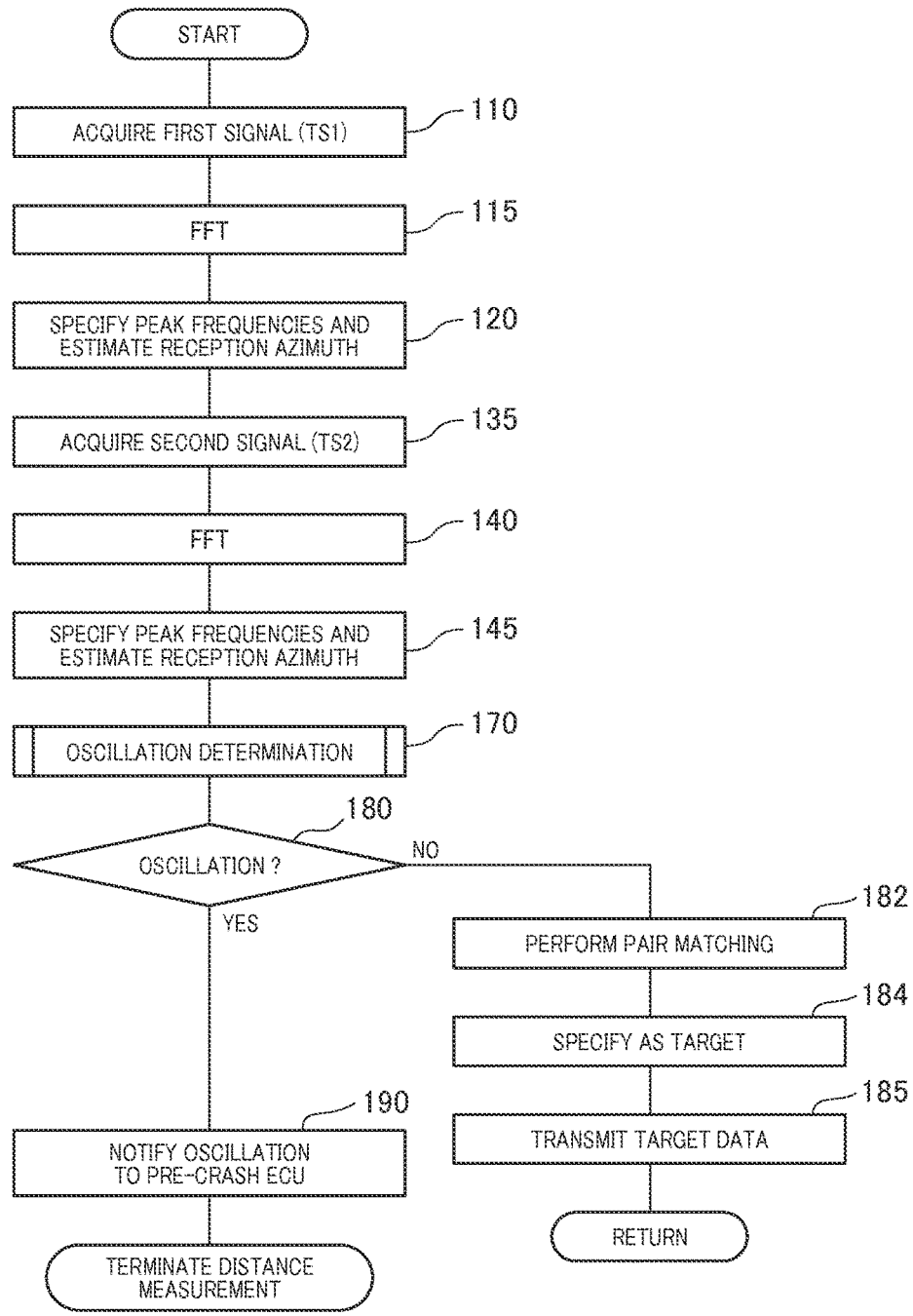
FIG. 7 is a flow chart illustrating a process performed by a control unit according to a second embodiment.

As described above, the control unit 22 inputs a triangular-wave digital signal of a predetermined cycle to the DAC 11, and at the same time performs the process shown in FIG. 7 in place of the process shown in FIG. 3.

In the process of FIG. 7, the control unit 22 acquires, at step 110 first, the beat signal of each channel inputted from the ADC 21 during the rise time Tbu and the fall time Tbd, as a beat signal corresponding to the first sub-modulated signal TS1, using the same method as at step 110 of FIG. 3.

Then, control proceeds to step 115 where the control unit 22 independently applies an FFT to the portion of the rise time Tbu and the portion of the fall time Tbd of the beat signal of each channel. Thus, frequency-intensity characteristics of the rise time Tbu (first frequency-rise time period) and frequency bin-intensity characteristics of the fall time Tbd (first frequency-fall time period) can be obtained for each channel.

The process at step 115 is also similar to step 115 of FIG. 3. However, more specifically, the sampling frequency in the FFT is, for example, 1 MHz. Accordingly, since the times Tbu and Tbd are each 0.5 ms, the number of samples in FFT is 500 points, and further, the number of frequency bins is 250. Thus, one frequency bin has a width of 1 MHz/500=2 kHz. This is similar to the first embodiment.

Then, at step 120, one peak frequency is specified for each target in each of the first frequency-rise time period and the first frequency-fall time period to estimate a reception azimuth corresponding to the peak frequency in question, using the same method as at step 120 of FIG. 3.

Then, at step 135, the control unit 22 acquires the beat signal of each channel inputted from the ADC 21 during the rise time Tau and the fall time Tad, as a beat signal corresponding to the second sub-modulated signal TS2, using the same method as at step 135 of FIG. 3.

Then, control proceeds to step 140 where the control unit 22 independently applies FFT to the portion of the rise time Tau and the portion of the fall time Tad of the beat signal of each channel. Thus, frequency-intensity characteristics of the rise time Tau (second frequency-rise time period) and frequency bin-intensity characteristics of the fall time Tad (second frequency-fall time period) can be obtained for each channel.

The process at step 140 is also similar to step 140 of FIG. 3. However, more specifically, the sampling frequency in the FFT is, for example, 1 MHz similar to step 115. Accordingly, since the times Tau and Tad are each 1.0 ms, the number of samples in FFT is 1000 points, and further, the number of frequency bins is 500. Thus, one frequency bin has a width of 1 MHz/1000=1 kHz. This is similar to the first embodiment.

With this configuration, the width of the FFT frequency for the rise and fall times Tau and Tad of the beat signal corresponding to the second sub-modulated signal TS2 is narrower than the width of the FFT frequency for the rise and fall times Tbu and Tbd of the beat signal corresponding to the first sub-modulated signal TS1. The former is ½ of the latter.

When the beat signal based on the first sub-modulated signal TS1 and that based on the second sub-modulated signal TS2 obtained at one sampling timing both include respective peaks corresponding to an identical actual target, the distances D finally detected by both according to the peaks are equal.

However, as described in the first embodiment, although $\Delta Fb$ and $\Delta Fa$ have the same value in the present embodiment, Tbu (=Tbd) is smaller than Tau (=Tad), while the first modulated gradient $\Delta Fb/Tbu$ (=$\Delta Fb/Tbd$) and the second modulated gradient $\Delta Fa/Tau$ (=$\Delta Fa/Tad$) are different from each other.

Accordingly, when the beat signal based on the first sub-modulated signal TS1 and that based on the second sub-modulated signal TS2 obtained at one sampling timing are both detected to include respective peaks corresponding to an identical actual target, fau<fbu and fad<fbd are established. When this is converted to frequency bin numbers, they are Bau=INT(fau·Tau), Bbu=INT(fbu·Tbu), Bad=INT(fad·Tad) and Bbd=INT(fbd·Tbd). In this case, INTO indicates an integer operator, e.g. INT(2.33)=2.

In this case, Bau is a frequency bin number of a peak resulting from an FFT processing of the beat signal of the rise time Tau, and Bbu is a frequency bin number of a peak resulting from an FFT processing of the beat signal of the rise time Tbu. The frequency bin number refers to a value of a sequential count of frequency bins in an ascending order of frequency, with a bin most approximate to frequency zero as being 0. The unit in this case is "bin".

Figure 8:
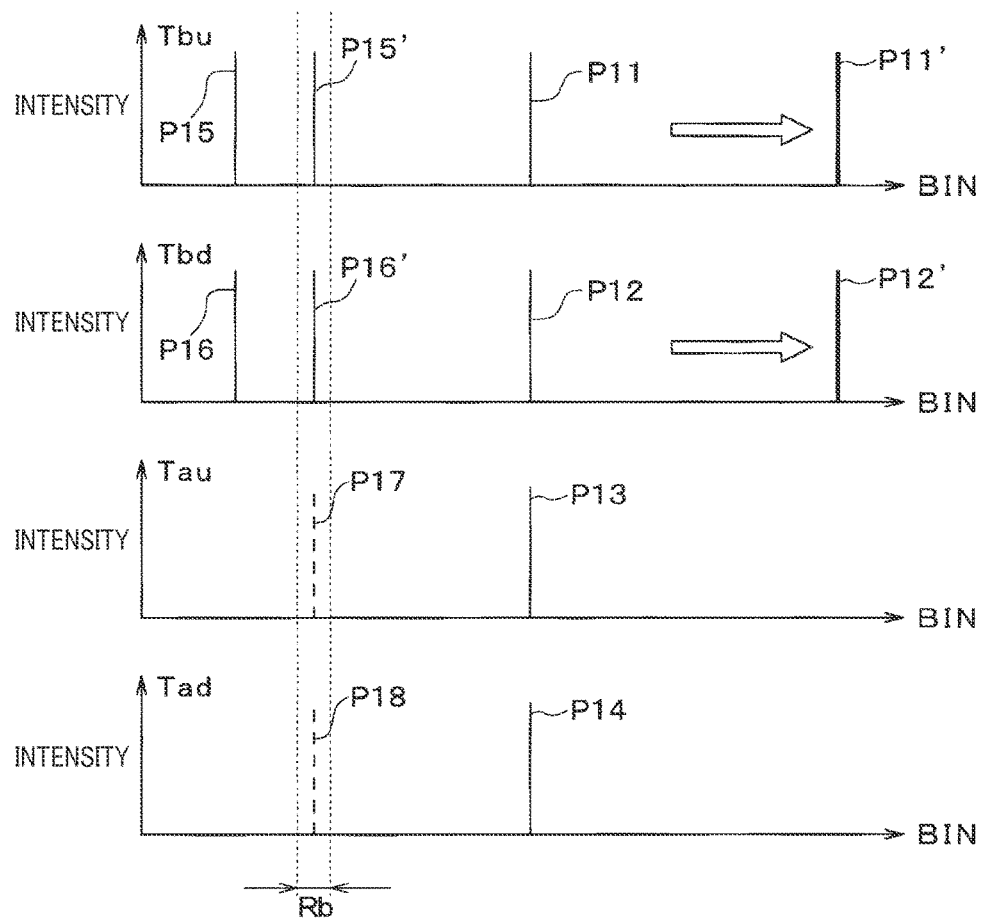
FIG. 8 is a graph illustrating a frequency-intensity relationship of beat signals acquired in time durations Tbu, Tbd, Tau and Tad of a modulated signal.

FIG. 8 is a graph illustrating a frequency bin number-intensity relationship of the beat signals acquired from the rise time (first frequency-rise time period) Tbu and the fall time (first frequency-fall time period) Tbd of the first sub-modulated signal TS1 and the rise time (second frequency-rise time period) Tau and the fall time (second frequency-fall time period) Tad of the second sub-modulated signal TS2. The peaks P11 to P14 correspond to an identical target (actually present target).

In FIG. 8, a virtual peak P11' is indicated at a position of Bbu·au/Tbu corresponding to the peak P11, and a virtual peak 12' is indicated at a position Bbd·Tad/Tbd corresponding to the peak 12.

The description so far has been focused on the case where the noise derived from the power supply bias circuit 10 is not superimposed on the beat signals. The following description will be focused on the case where oscillation is periodically caused in the power supply bias circuit 10, and resultantly, oscillation noise is superimposed on the supply voltage provided at least to the BB system (covering from the mixer output to the ADC 21, e.g. ADC 21) among the BB system, the reception system, the BA system and the PA system.

In this case, as shown in FIG. 8, in addition to the peaks P11 to P14 derived from the normal signals, the beat signals in the portions Tbu, Tbd, Tau and Tad come to include peaks P15 to P18 corresponding to the influence of the oscillation noise. The peaks P15 to P18 are constantly generated at a specific frequency, irrespective of the modulation inclinations of the sub-modulated signals TS1 and TS2. Accordingly, the frequencies of the peaks P15 to P18 are the same in all of Tbu, Tbd, Tau and Tad.

In FIG. 8, a virtual peak 15' is indicated at a position of Bbu·au/Tbu corresponding to the peak 15, and a virtual peak P16' is indicated at a position of Bbd·Tad/Tbd corresponding to the peak P16.

At step 170 subsequent to step 145, an oscillation determination is made. In the oscillation determination, the control unit 22 determines, as described above, whether or not the oscillation noise derived from the power supply bias circuit 10 has been superimposed on the supply voltage provided to the BB system.

In the oscillation determination, as shown in FIG. 9, the control unit 22 determines, at step 305 first, whether or not there is any group in which an amount Bbu·Tau/Tbu obtained by multiplying Tau/Tbu (ratio between the first and second modulated gradients) with a frequency bin number Bbu of the peak of the first frequency-rise time period Tbu, and the frequency bin number Bau of the peak of the second frequency-rise time period Tau (corresponding to an example of the varying portion) of the group are within the same frequency bin number range Rb, among the groups (which may be zero, one, or two or more) each obtained by extracting the peaks of the beat signal in a manner of extracting one from each of the portions Tbu and Tau.

For example, groups each obtained by extracting peaks of the beat signals in a manner of extracting one from each of the portions Tbu and Tau are formed with as many combinations as possible. The control unit 22 determines whether or not the difference between Bau and Bbu·Tau/Tbu in each formed group is not more than the width of the frequency bin number range Rb (with a degree of error being, for example, 10 bins), i.e. whether or not Bau≈Bbu·Tau/Tbu is established. If there are one or more groups in which the calculated width is not more than the width of the frequency bin number range Rb, it is determined that there are groups of the same frequency range Rf.

Taking the example shown in FIG. 8, at step 305, only the group of peaks P15 and P17 satisfies the relation Bau≈Bbu·Tau/Tbu, but other groups (i.e. a group of peaks P15 and P13, a group of peaks P11 and P13, and a group of peaks P11 and P17) do not satisfy the relation Bau≈Bbu·Tau/Tbu.

As a result, at step 305, it is determined that there is a group that satisfies the relation Bau≈Bbu·Tau/Tbu, and then control proceeds to step 310.

Unlike the example shown in FIG. 8, if no oscillation noise derived from the oscillation of the power supply bias circuit 10 is generated, the sole group of peaks P11 and P13 does not satisfy the relation Bau≈Bbu·Tau/Tbu. Accordingly, the control unit 22 determines, at step 305, that there is no group that satisfies the relation Bau≈Bbu·Tau/Tbu. Then, control proceeds to step 320 where the oscillation flag is cleared (turned off) to terminate the oscillation determination.

At step 310, each peak (e.g., P15) in the rise time Tbu which has satisfied the relation Bau≈Bbu·Tau/Tbu is subjected to determination as described below. It should be noted that the peaks subjected to determination can be zero, one, or two or more.

First, the control unit 22 searches for a peak whose difference in frequency bin number from the peak subjected to determination, as a result of comparison, is not more than the width of the frequency bin number range Rb (with a degree of error being, for example, two bins that is ±1 bin), i.e. searches for a peak whose frequency bin number substantially coincides with that of the peak subjected to determination, through the peaks in the fall time Tbd (e.g., P12 and P16) to determine the presence/absence of such a peak.

If there is any such a peak, the peak subjected to determination has a high probability of being a peak derived from the oscillation of the bias circuit 10. If not, the peak subjected to determination has a very low probability of being a peak derived from the oscillation of the bias circuit 10.

Accordingly, if it is determined that there is no such a peak, in respect of all the groups of peaks subjected to determination, control proceeds to step 320 where the oscillation flag is cleared to terminate the oscillation determination. On the other hand, if it is determined that there is such a peak in one or more groups, from among the groups of peaks subjected to determination, control proceeds to step 315.

At step 315, the control unit 22 determines whether or not the peak intensities of all the peaks in a group are within a predetermined peak intensity range, in respect of all the groups of peaks that have satisfied the relation Bau≈Bbu·Tau/Tbu and also a relation Bbu≈Bbd (i.e. the groups in each of which one peak has been extracted from each of the portions Tbu, Tbd and Tau).

As a matter of fact, the determination at step 315 is conducted taking account of the case where, when a plurality of actual targets are detected at one sampling timing, the frequency bin numbers of the peaks corresponding to different targets could incidentally satisfy the relation Bau≈Bbu·Tau/Tbu and also the relation Bbu≈Bbd.

A typical situation where the frequencies of the peaks corresponding to different targets could incidentally coincide is the same as the situation described in the first embodiment referring to FIG. 6. In the situation of FIG. 6, the peaks Px1, Px2 and Py3 satisfy the relation Bau≈Bbu·Tau/Tbu and also the relation Bbu≈Bbd.

However, in the case of FIG. 6 as well, the peak intensities of the peaks Px1 and Px2 corresponding to the target X are unlikely to be equal to the peak intensities of the peaks Py3 and Py4 corresponding to the target Y, as already described above.

On the other hand, the path through which the oscillation of the bias circuit 10 is superimposed on the BB system remains unchanged, irrespective of the modulation inclinations of the sub-modulated signals TS1 and TS2 (i.e. ΔFb/Tbu, ΔFb/Tbd, ΔFa/Tau and ΔFa/Tad). Accordingly, the peak intensities of the peaks P15 to P18 (see FIG. 8) of the beat signals derived from the oscillation noise remain unchanged, irrespective of the modulation inclinations.

From this point of view, at step 315, as at step 315, the control unit 22 is ensured to determine whether or not there are groups in each of which the peak intensities of all the peaks of the group are within a predetermined peak intensity range, in respect of all the groups in each of which the peaks satisfy the relation Bau≈Bbu·Tau/Tbu and also the relation Bbu≈Bbd (i.e. the groups in each of which one peak has been extracted from each of the portions Tbu, Tbd and Tau). The predetermined peak intensity range may be one that covers substantially the approximate values. For example, the range may cover from a minimum peak intensity in the groups of peaks subjected to determination, to a peak intensity that is the minimum peak intensity+1 dB.

At step 315, if it is determined that there is at least one group in which the peak intensities of all the peaks in the group are within a predetermined peak intensity range, from among the groups of peaks subjected to determination, control proceeds to step 325 where the oscillation flag is set. Then, the oscillation determination is terminated. FIG. 8 shows an example of such a case.

If it is determined that the peak intensities of none of the peaks in the group is within a predetermined peak intensity range, in respect of all the groups of peaks subjected to determination, control proceeds to step 320 where the oscillation flat is cleared. Then, the oscillation determination is terminated. FIG. 6 shows an example of such a case.

In this way, applying a criterion as used at step 315 to the oscillation determination, the probability of erroneously detecting the oscillation of the power supply bias circuit 10 can be more lowered, compared to the case where the oscillation flag is set whenever there is any group of peaks satisfying the relation Bau≈Bbu·Tau/Tbu and also the relation Bbu≈Bbd.

Subsequent to the oscillation determination at step 170, control proceeds to step 180 where, based on the result of the oscillation determination, it is determined whether or not there is oscillation in the power supply bias circuit 10. Specifically, if the oscillation flag is set, the control unit 22 determines that there is oscillation in the power supply bias circuit 10 and then control proceeds to step 190. If the oscillation flag is cleared, the control unit 22 determines that there is no oscillation in the power supply bias circuit 10 and then control proceeds to step 182.

At step 182, pair matching is performed. Specifically, pairs of peak frequencies corresponding to an identical target are extracted from between the peak frequencies of the first frequency-rise time period Tbu and the peak frequencies of the first frequency-fall time period Tbd specified at step 120. Further, pairs of peak frequencies corresponding to an identical target are extracted from between the peak frequencies of the second frequency-rise time period Tau and the peak frequencies of the second frequency-fall time period Tad specified at step 140. The method described at steps 125 and 150 of FIG. 3 is adopted as a method of pair matching.

Then, at step 184, a target is specified for each pair extracted at step 170. In specifying a target, the control unit 22 uses the peak frequencies of an object pair to calculate a distance from the own apparatus to a target corresponding to the object pair, a relative speed of the target relative to the own apparatus, and an azimuth of the target as viewed from the own apparatus. The calculated results are used as target data of the pair in question. The method described at steps 130 and 155 of FIG. 3 is adopted as a specific method of specifying a target.

Then, at step 185, the target data resulting from the immediately preceding step 184 are transmitted to the pre-crash control ECU via the CAN 2. The control performed by the pre-crash control ECU upon reception of the target data is the same as the one described in the first embodiment. After step 185, control waits until the next sampling timing, and then returns to step 110.

At step 190, a signal indicating the occurrence of oscillation in the power supply bias circuit 10 is outputted such as to the pre-crash control ECU via the CAN 2. Upon reception of the signal, the pre-crash control ECU may warn the vehicle occupants of the abnormality. After step 190, the distance measurement is terminated because there is a high probability of performing an erroneous detection due to the abnormality in the power supply device circuit 10. In other words, the process of FIG. 7 (e.g., preparation and transmission of target data) is not repeated any more.

As described above, in the present embodiment, the control unit 22 determines, at step 170, whether or not predetermined oscillation conditions are satisfied. If satisfied, the oscillation flag is set, but if not, the oscillation flag is cleared.

The predetermined oscillation conditions include all of condition 5 adopted at step 305, condition 6 adopted at step 310, condition 7 adopted at step 315, and condition 8 adopted at step 220 described above, as essential conditions.

Particularly, the condition adopted as the condition 5 is that, of one or more groups each being formed by extracting the peaks of the beat signals in a manner of extracting one from each of the first frequency-rise time period Tbu and the second frequency-rise time period Tau (corresponding to an example of the varying portion), it is determined that there is a group in which an amount Bbu·Tau/Tbu obtained by multiplying a ratio Tau/Tbu between the first and second modulated gradients with a frequency bin number Bbu of the one peak, and the frequency bin number Bau of the peak of the varying portion Tau of the group are within the same frequency bin number range (i.e. Bau≈Bbu·Tau/Tbu is satisfied). With this configuration, the noise constantly applied to beat signals can be detected with a novel method that cannot be found in the conventional art.

In the above embodiment, the control unit 22 performs steps 110 and 135 of FIGS. 2 and 7 to function as an example of the acquiring means (or portion), performs steps 120 and 145 to function as an example of the peak frequency specifying means (or portion), performs step 170 to function as an example of the oscillation determining means (or portion), performs steps 180 and 190 to function as an example of the notifying means (or portion), performs step 125 to function as an example of the B pair matching means (or portion), performs step 130 to function as an example of the B target specifying means (or portion), performs step 150 to function as an example of the A pair matching means (or portion), performs step 155 to function as an example of the A target specifying means (or portion), and performs steps 115 and 140 to function as an example of the discrete Fourier transforming means (or portion).

Other Embodiments

The present invention should not be construed as being limited to the foregoing embodiments, but may be modified as appropriate within a scope of the claims. The foregoing embodiments are not unrelated from each other but can be combined as appropriate except for the case where the combination is evidently impossible. As a matter of course, in the foregoing embodiments, the components configuring the embodiments are not necessarily essential except for the case where, for example, the components are explicitly indicated as being essential and are considered to be evidently essential in principle. Further, in the foregoing embodiments, where numerical values, such as the numbers, numerical values, amounts and ranges, are referred to, the numerical values should not be construed as being limited to the specified numbers, except for the case where the numerical values are explicitly indicated as being essential and are evidently limited to the specified numbers in principle.

Modification 1

For example, in the first and second embodiments described above, if the oscillation flag is set at one sampling timing, the control unit determines, at step 180 of FIG. 2, that oscillation has been caused in the power supply bias circuit 10 even when the oscillation flag has not been set at the preceding sampling timing, and transmits a signal indicating the occurrence of oscillation to the pre-crash control ECU.

However, the configuration should not be necessarily provided in this way. For example, the control unit may refrain from determining the occurrence of oscillation in the power supply bias circuit 10 at step 180 of FIG. 2, until when the sampling timing of turning on the oscillation flag occurs by a predetermined plurality of number of times or more. When the sampling timing of turning on the oscillation flag has occurred by a predetermined plurality of number of times or more, the control unit may be ensured to determine, for the first time, the occurrence of oscillation in the power supply bias circuit 10 and transmit a signal indicating the occurrence of oscillation to the pre-crash control ECU. With this configuration, oscillation determination of higher accuracy can be realized.

Specifically, in the beat signals corresponding to reception signals reflected from an actual target whose relative speed relative to the FMCW radar apparatus 1 is zero, the distance D calculated based on the peaks is constant but the peak intensities are not retained at a constant level because of the influence of multipath caused by the road surface or surrounding objects. However, when the oscillation noise derived from the oscillation of the power supply bias circuit 10 is superimposed on the supply voltage provided to the BB system, the peak intensities in the beat signals derived from the oscillation noise are retained at a constant level, irrespective of the surrounding conditions. Accordingly, use of the above matter as a criterion for determining oscillation can further lower the probability of erroneously detecting the oscillation of the power supply bias circuit 10.

Modification 2

In the second embodiment described above, the first sub-modulated signal TS1 has the first frequency-rise time period Tbu and the first frequency-fall time period Tbd, while the second sub-modulated signal TS2 has the second frequency-rise time period Tau and the second frequency-fall time period Tad.

However, the configuration does not have to be necessarily provided in this way. For example, the second sub-modulated signal TS2 may have the second frequency-rise time period Tau but may be ensured not to have the second frequency-fall time period Tad. In this case as well, target data can be prepared using the beat signal of the first frequency-rise time period Tbu and the first frequency-fall time period Tbd.

Modification 3

Contrarily, the second sub-modulated signal TS2 may have the second frequency-fall time period Tad but may be ensured not to have the second frequency-rise time period Tau. In this case as well, target data can be prepared using the beat signal of the first frequency-rise time period Tbu and the first frequency-fall time period Tbd.

In this case, in the oscillation determination process of FIG. 9, the peak of the beat signal of the second frequency-fall time period Tad, instead of the peak of the beat signal of the second frequency-rise time period Tau, may be used as the varying portion.

Specifically, the control unit 22 determines, at step 305, whether or not there is any group in which an amount Bbu·Tad/Tbu obtained by multiplying Tad/Tbu (ratio between the first and second modulated gradients) with the frequency bin number Bbu of the peak of the first frequency-rise time period Tbu, and the frequency bin number Bad of the peak of the second frequency-fall time period Tad of the group are within the same frequency bin number range Rb, among the groups (which may be zero, one, or two or more) each obtained by extracting the peaks of the beat signal in a manner of extracting one from each of the portions Tbu and Tad (i.e. determines whether or not Bad≈Bbu·Tad/Tbu is satisfied).

Further, at step 310, each peak in Tbu, which has satisfied the relation Bad≈Bbu·Tad/Tbu, is subjected to determination to perform determination as follows. First, the control unit 22 searches for a peak whose difference in frequency bin number from the peak subjected to determination, as a result of comparison, is not more than the width of the frequency bin number range Rb (Bbu≈Bbd), through the peaks in Tbd to determine the presence/absence of such a peak.

At step 315, the control unit 22 determines whether or not there is a group in which the peak intensities of all the peaks of the group are within a predetermined peak intensity range, in respect of all the groups in each of which the peaks satisfy the relation Bad≈Bbu·Tad/Tbu and also the relation Bbu≈Bbd (i.e. the groups in each of which one peak has been extracted from each of the portions Tbu, Tbd and Tad).

In the oscillation determination process of FIG. 9, the method of using the peak of the beat signal of the second frequency-fall time period Tad as the varying portion, instead of using the peak of the beat signal of the second frequency-rise time period Tau may be applied to the case where the second sub-modulated signal TS2 has both of the second frequency-rise time period Tau and the second frequency-fall time period Tad.

Modification 4

In the oscillation determination process of FIG. 9 in the second embodiment and the modification 3 described above, the role may be switched between the peak of the beat signal of the first frequency-fall time period Tbd and the peak of the beat signal of the first frequency-rise time period Tbu.

For example, when such a switch is performed in the modification 3, the control unit 22 determines, at step 305, whether or not there is any group in which an amount Bbd·Tad/Tbd obtained by multiplying Tad/Tbd (ratio between the first and second modulated gradients) with a frequency bin number Bbd of the peak of the first frequency-fall time period Tbd, and the frequency bin number Bad of the peak of the second frequency-fall time period Tad of the group are within the same frequency bin number range Rb, among the groups (which may be zero, one, or two or more) each obtained by extracting the peaks of the beat signals in a manner of extracting one from each of the portions Tbd and Tad (i.e. determines whether or not Bad≈Bbd·Tad/Tbd is satisfied).

Further, at step 310, each peak in Tbu, which has satisfied the relation Bad≈Bbd·Tad/Tbd, is subjected to determination to perform determination as follows. First, the control unit 22 searches for a peak whose difference in frequency bin number the peak subjected to determination, as a result of comparison, is not more than the width of the frequency bin number range Rb (Bbd≈Bbu), through the peaks in Tbu to determine the presence/absence of such a peak.

At step 315, the control unit 22 determines whether or not there is a group in which the peak intensities of all the peaks of the group are within a predetermined peak intensity range, in respect of all the groups in each of which the peaks satisfy the relation Bad≈Bbd·Tad/Tbd and also the relation Bbd-≈Bbu (i.e. the groups in each of which one peak has been extracted from each of the portions Tbd, Tbu and Tad).

Modification 5

In the foregoing embodiments, at each sampling timing, transmission of the first sub-modulated signal TS1 is ensured to be followed by transmission of the second sub-modulated signal TS2. However, contrary to this, at each sampling timing, transmission of the second sub-modulated signal TS2 may be ensured to be followed by transmission of the first sub-modulated signal TS1.

Modification 6

In the foregoing embodiments, the first modulated gradient $\Delta Fb/Tbu=\Delta Fb/Tbd$ is larger than the second modulated gradient $\Delta Fa/Tau=\Delta Fa/Tad$. However, contrary to this, the first modulated gradient may be smaller than the second modulated gradient.

Modification 7

In the foregoing embodiments, at each sampling timing, additional sub-modulated signals, such as a third sub-modulated signal TS3, and a third sub-modulated signal TS4, may be ensured to be transmitted, in addition to the first and second sub-modulated signals TS1 and TS2. Each of the additional sub-modulated signals may be transmitted before the first and second sub-modulated signals TS1 and TS2, or may be transmitted after the first and second sub-modulated signals TS1 and TS2, or may be transmitted after transmission of the first sub-modulated signal TS1 but before transmission of the second sub-modulated signal TS2.

Modification 8

In the first embodiment described above, the determination processing at step 210 of FIG. 5 may be omitted. In this case, if it is determined, at step 205, that there is a group of the same frequency range Rf, control proceeds to step 215. Similarly, the determination processing at step 215 may be omitted, or the determination processing at step 220 may be omitted. Further, of the determination processings at steps 210, 215 and 220, any two determination processings may be omitted, or all of the determination processings at steps 210, 215 and 220 may be omitted.

Modification 9

In the second embodiment described above, the determination processing at step 310 of FIG. 9 may be omitted. In this case, if it is determined, at step 350, that there is a group satisfying the relation Bau≈Bbu·Tau/Tbu, control proceeds to step 315. Similarly, the determination processing at step 315 may be omitted, or both of the determination processing at steps 310 and 315 may be omitted.

Modification 10

The receiving antennas 18b to 18x in the foregoing embodiments may be eliminated, solely leaving the receiving antenna 18a. In this case, the mixers 19b to 19x are also eliminated, solely leaving the mixer 19b. In this case, the control unit 22 may be ensured not to perform the azimuth estimation at steps 120 and 145 of FIGS. 3 and 7.

REFERENCE SIGNS LIST

1 FMCW radar apparatus
10 Power supply bias circuit
11 DAC
12 VCO
13 BA
14 Distributor
15 PA
16 Transmitting antenna
17 Local amplifier
18a to 18x Receiving antennas
19a to 19x Mixers
22 Control unit

The invention claimed is:
1. An FMCW radar apparatus comprising:
a transmission unit that transmits a transmission signal including a first frequency-rise time period whose frequency sequentially rises with a first modulated gradient, a first frequency-fall time period whose frequency sequentially falls with the first modulated gradient, a second frequency-rise time period whose frequency sequentially rises with a second modulated gradient different from the first modulated gradient, and a second frequency-fall time period whose frequency sequentially falls with the second modulated gradient;
a reception unit that receives a reception signal resulting from reflection of the transmission signal by a target and outputs beat signals based on the transmission signal and the reception signal;
a control unit that detects a target on the basis of the beat signals; and
a power supply bias circuit that supplies power-supply voltage to at least the transmission unit and the control unit, among the transmission unit, the reception unit and the control unit, wherein:
the control unit includes:
acquiring means for acquiring the beat signals outputted by the reception unit;
a peak frequency specifying means for specifying frequencies of a plurality of peaks respectively for the first frequency-rise time period, the first frequency-fall time period, the second frequency-rise time period and the second frequency-fall time period of the beat signals acquired by the acquiring means;
oscillation determining means for determining whether or not oscillation conditions are satisfied; and
notifying means for notifying occurrence of oscillation in the power supply bias circuit on the basis of a determination that the oscillation conditions are satisfied, the determination being made by the oscillation determining means; and
the oscillation determining means uses, as objects, the plurality of peaks specified by the peak frequency specifying means to determine that the oscillation conditions are satisfied, on the basis that, of groups each of which is formed by extracting peaks in a manner of extracting one from each of the first frequency-rise time period, the first frequency-fall time period, the second frequency-rise time period and the second frequency-fall time period, there is a group in which all peaks of the group are within the same frequency range.

2. The FMCW radar apparatus according to claim 1, wherein the oscillation determining means determines that the oscillation conditions are satisfied, on the basis of a matter that, of groups each of which is formed by extracting peaks in a manner of extracting one from each of the first frequency-rise time period, the first frequency-fall time period, the second frequency-rise time period and the second frequency-fall time period, there is a group in which all peaks of the group are within the same frequency range, and a matter that, of one or more groups of peaks that are determined to be within the same frequency rage, there is a group in which peak intensities of all peaks of the group are within a predetermined peak intensity range.

3. The FMCW radar apparatus according to claim 1, comprising:
B pair matching means for extracting a plurality of pairs of frequencies having peaks corresponding to an identical target, between frequencies of a plurality of peaks of the first frequency-rise time period, and frequencies of a plurality of peaks of the first frequency-fall time period;
B target specifying means for calculating, for each of the plurality of pairs extracted by the B pair matching means, a distance to a B target corresponding to the pair, for use as target data;
A pair matching means for extracting a plurality of pairs of frequencies having peaks corresponding to an identical target, between frequencies of a plurality of peaks of the second frequency-rise time period, and frequencies of a plurality of peaks of the second frequency-fall time period; and A target specifying means for calculating, for each of the plurality of pairs extracted by the A pair matching means, a distance to an A target corresponding to the pair, wherein:

the oscillation determining means uses, as objects, the plurality of peaks specified by the peak frequency specifying means to make a determination that, of groups each of which is formed by extracting peaks in a manner of extracting one from each of the first frequency-rise time period, the first frequency-fall time period, the second frequency-rise time period and the second frequency-fall time period, there is a group in which all peaks of the group are within the same frequency range, and uses one or more groups of peaks as objects to be determined, the groups being determined to be within the same frequency range, to search for a target having a distance equal to a distance to a target that corresponds to frequency of the peak of the first frequency-rise time period and frequency of the peak of the first frequency-fall time period in each of the groups as objects to be determined, through the A targets whose distances are calculated by the A target specifying means and, as a result of the search, make a determination that, in one or more groups of the objects to be determined, such a target is not present in the A targets, and then determines that the oscillation conditions are satisfied on the basis of these determinations.

4. The FMCW radar apparatus according to claim 1, wherein the notifying means notifies occurrence of oscillation in the power supply bias circuit that supplies power-supply voltage to the FMCW radar apparatus, on the basis of a predetermined number or more of times of determination that the oscillation conditions are satisfied, the determination being made by the oscillation determining means.

5. An FMCW radar apparatus comprising:
a transmission unit that transmits a transmission signal including a first frequency-rise time period whose frequency sequentially rises with a first modulated gradient, a first frequency-fall time period whose frequency sequentially falls with the first modulated gradient, and a varying portion whose frequency sequentially varies with a second modulated gradient different from the first modulated gradient;
a reception unit that receives a reception signal resulting from reflection of the transmission signal by a target and outputs beat signals based on the transmission signal and the reception signal;
a control unit that detects a target on the basis of the beat signals; and
a power supply bias circuit that supplies power-supply voltage to at least the transmission unit and the control unit, among the transmission unit, the reception unit and the control unit, wherein:
the control unit includes:
acquiring means for acquiring the beat signals outputted by the reception unit;
discrete Fourier transforming means for performing discrete Fourier transform for each of the first frequency-rise time period, the first frequency-fall time period and the varying portion to obtain frequency bin-intensity characteristics;
oscillation determining means for determining whether or not oscillation conditions are satisfied; and notifying means for notifying occurrence of oscillation in the power supply bias circuit on the basis of a determination that the oscillation conditions are satisfied, the determination being made by the oscillation determining means; and the oscillation determining means determines that the oscillation conditions are satisfied, on the basis of a determination that, of one or more groups each of which is formed by extracting peaks of beat signals in a manner of extracting one from either one of the first frequency-rise time period and the first frequency-fall time period and one from the varying portion, there is a group in which an amount obtained by multiplying a ratio between the first modulated gradient and the second modulated gradient with a frequency bin number of the one peak, and a frequency bin number of a peak of the varying portion of the group are within the same bin number range, the determination being based on the frequency bin-intensity characteristics obtained by the discrete Fourier transforming means.

6. The FMCW radar apparatus according to claim 5, wherein the oscillation conditions are determined to be satisfied on the basis of: a determination that, of one or more groups each of which is formed by extracting peaks of beat signals in a manner of extracting one from either one of the first frequency-rise time period and the first frequency-fall time period and one from the varying portion, there is a group in which an amount obtained by multiplying a ratio between the first modulated gradient and the second modulated gradient with a frequency bin number of the one peak, and a frequency bin number of a peak of the varying portion of the group are within the same bin number range, the determination being made on the basis of the frequency bin-intensity characteristics obtained by the discrete Fourier transforming means; and a determination that, of one or more groups each of which is formed by extracting peaks of beat signals in a manner of extracting one from each of the first frequency-rise time period and the first frequency-fall time period, there is a group in which the frequency bin numbers of all peaks of the group are within the same bin number range, the determination being made on the basis of the frequency bin-intensity characteristics obtained by the discrete Fourier transforming means.

7. The FMCW radar apparatus according to claim 5, wherein the oscillation conditions are determined to be satisfied on the basis of: a determination that, of one or more groups each of which is formed by extracting peaks of beat signals in a manner of extracting one from either one of the first frequency-rise time period and the first frequency-fall time period and one from the varying portion, there is a group in which all peaks of the group are within the same bin number range; and a determination that, of one or more groups which are determined to be in the same frequency range, there is a group in which peak intensities of all peaks of the group are within the same peak intensity range, the determinations being made on the basis of the frequency bin-intensity characteristics obtained by the discrete Fourier transforming means.

8. The FMCW radar apparatus according to claim 5, wherein the notifying means notifies occurrence of oscillation in the power supply bias circuit that supplies power-supply voltage to the FMCW radar apparatus, on the basis of a predetermined number or more times of determination that the oscillation conditions are satisfied, the determination being made by the oscillation determining means.

9. The FMCW radar apparatus according to claim 2 comprising:
- B pair matching means for extracting a plurality of pairs of frequencies having peaks corresponding to an identical target, between frequencies of a plurality of peaks of the first frequency-rise time period, and frequencies of a plurality of peaks of the first frequency-fall time period;
- B target specifying means for calculating, for each of the plurality of pairs extracted by the B pair matching means, a distance to a B target corresponding to the pair, for use as target data;
- A pair matching means for extracting a plurality of pairs of frequencies having peaks corresponding to an identical target, between frequencies of a plurality of peaks of the second frequency-rise time period, and frequencies of a plurality of peaks of the second frequency-fall time period; and
- A target specifying means for calculating, for each of the plurality of pairs extracted by the A pair matching means, a distance to an A target corresponding to the pair, wherein:
- the oscillation determining means uses, as objects, the plurality of peaks specified by the peak frequency specifying means to make a determination that, of groups each of which is formed by extracting peaks in a manner of extracting one from each of the first frequency-rise time period, the first frequency-fall time period, the second frequency-rise time period and the second frequency-fall time period, there is a group in which all peaks of the group are within the same frequency range, and uses one or more groups of peaks as objects to be determined, the groups being determined to be within the same frequency range, to search for a target having a distance equal to a distance to a target that corresponds to frequency of the peak of the first frequency-rise time period and frequency of the peak of the first frequency-fall time period in each of the groups as objects to be determined, through the A targets whose distances are calculated by the A target specifying means and, as a result of the search, make a determination that, in one or more groups of the objects to be determined, such a target is not present in the A targets, and then determines that the oscillation conditions are satisfied on the basis of these determinations.

10. The FMCW radar apparatus according to claim 9, wherein the notifying means notifies occurrence of oscillation in the power supply bias circuit that supplies power-supply voltage to the FMCW radar apparatus, on the basis of a predetermined number or more of times of determination that the oscillation conditions are satisfied, the determination being made by the oscillation determining means.

11. The FMCW radar apparatus according to claim 3, wherein the notifying means notifies occurrence of oscillation in the power supply bias circuit that supplies power-supply voltage to the FMCW radar apparatus, on the basis of a predetermined number or more of times of determination that the oscillation conditions are satisfied, the determination being made by the oscillation determining means.

12. The FMCW radar apparatus according to claim 6, wherein the oscillation conditions are determined to be satisfied on the basis of: a determination that, of one or more groups each of which is formed by extracting peaks of beat signals in a manner of extracting one from either one of the first frequency-rise time period and the first frequency-fall time period and one from the varying portion, there is a group in which all peaks of the group are within the same bin number range; and a determination that, of one or more groups which are determined to be in the same frequency range, there is a group in which peak intensities of all peaks of the group are within the same peak intensity range, the determinations being made on the basis of the frequency bin-intensity characteristics obtained by the discrete Fourier transforming means.

13. The FMCW radar apparatus according to claim 12, wherein the notifying means notifies occurrence of oscillation in the power supply bias circuit that supplies power-supply voltage to the FMCW radar apparatus, on the basis of a predetermined number or more times of determination that the oscillation conditions are satisfied, the determination being made by the oscillation determining means.

14. The FMCW radar apparatus according to claim 13, wherein the notifying means notifies occurrence of oscillation in the power supply bias circuit that supplies power-supply voltage to the FMCW radar apparatus, on the basis of a predetermined number or more times of determination that the oscillation conditions are satisfied, the determination being made by the oscillation determining means.

* * * * *